(12) United States Patent
Lai et al.

(10) Patent No.: US 9,460,421 B2
(45) Date of Patent: Oct. 4, 2016

(54) DISTRIBUTING NOTIFICATIONS TO MULTIPLE RECIPIENTS VIA A BROADCAST LIST

(75) Inventors: William Y. Lai, Bellevue, WA (US); Jagadeesh Kalki, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2167 days.

(21) Appl. No.: 11/609,100

(22) Filed: Dec. 11, 2006

(65) Prior Publication Data
US 2007/0083561 A1    Apr. 12, 2007

Related U.S. Application Data

(63) Continuation of application No. 10/696,916, filed on Oct. 30, 2003, now abandoned, and a continuation-in-part of application No. 10/017,680, filed on Oct. 22, 2001, now Pat. No. 7,302,634.

(60) Provisional application No. 60/275,809, filed on Mar. 14, 2001.

(51) Int. Cl.
*G06F 17/30* (2006.01)
*G06Q 10/10* (2012.01)
(Continued)

(52) U.S. Cl.
CPC ........... *G06Q 10/109* (2013.01); *G06F 21/335* (2013.01); *G06F 21/629* (2013.01); *G06F 21/6218* (2013.01); *G06F 21/6227* (2013.01); *G06F 21/6236* (2013.01); *G06F 21/6245* (2013.01); *G06F 21/6272* (2013.01); *H04L 29/06* (2013.01); *H04L 63/10* (2013.01); *H04L 63/102* (2013.01); *H04L 67/02* (2013.01); *H04L 67/16* (2013.01); *H04L 67/28* (2013.01); *H04L 67/2819* (2013.01); *H04L 67/303* (2013.01); *H04L 67/306* (2013.01);
(Continued)

(58) Field of Classification Search
USPC .............................. 707/999.01, 999.107, 636
See application file for complete search history.

(56) References Cited

U.S. PATENT DOCUMENTS

| | | |
|---|---|---|
| 5,031,089 A | 7/1991 | Liu |
| 5,218,680 A | 6/1993 | Farrell |

(Continued)

FOREIGN PATENT DOCUMENTS

| | | |
|---|---|---|
| CA | 2 428 481 A1 | 12/2003 |
| EP | 0 147 574 A2 | 7/1985 |

(Continued)

OTHER PUBLICATIONS

Imamura et al., "Metadata Representation in XML for Internet-Based Electronic XML Application from Business to Government," IEEE, Jul. 2000, pp. 387-392.

(Continued)

*Primary Examiner* — Yuk Ting Choi
(74) *Attorney, Agent, or Firm* — Dan Choi; L. Alan Collins; Micky Minhas

(57) ABSTRACT

Processing a notification intended for delivery to multiple recipients associated with a broadcast list. Software executes within an alerts service environment to receive a notification addressed to a broadcast alias, determine a list of recipients associated with the broadcast alias to receive the notification, and broadcast the received notification to each recipient in the determined list.

19 Claims, 6 Drawing Sheets

(51) Int. Cl.
- *G06F 21/33* (2013.01)
- *G06F 21/62* (2013.01)
- *H04L 29/06* (2006.01)
- *H04L 29/08* (2006.01)

(52) U.S. Cl.
CPC .... *H04L 67/325* (2013.01); *G06F 2221/2115* (2013.01); *G06F 2221/2117* (2013.01); *G06F 2221/2119* (2013.01); *G06F 2221/2141* (2013.01); *G06F 2221/2149* (2013.01); *H04L 67/40* (2013.01); *H04L 67/42* (2013.01); *H04L 69/329* (2013.01); *Y10S 707/99931* (2013.01); *Y10S 707/99939* (2013.01); *Y10S 707/99942* (2013.01); *Y10S 707/99943* (2013.01)

(56) References Cited

U.S. PATENT DOCUMENTS

| | | | |
|---|---|---|---|
| 5,440,744 | A | 8/1995 | Jacobson |
| 5,446,880 | A | 8/1995 | Balgeman et al. |
| 5,485,409 | A | 1/1996 | Gupta |
| 5,487,141 | A | 1/1996 | Cain et al. |
| 5,493,692 | A | 2/1996 | Theimer |
| 5,544,285 | A | 8/1996 | Glaser |
| 5,544,302 | A | 8/1996 | Nguyen |
| 5,557,320 | A | 9/1996 | Krebs |
| 5,634,053 | A | 5/1997 | Noble et al. |
| 5,634,129 | A | 5/1997 | Dickinson |
| 5,640,504 | A * | 6/1997 | Johnson, Jr. .................. 714/4.4 |
| 5,640,569 | A | 6/1997 | Miller |
| 5,666,534 | A | 9/1997 | Gilbert et al. |
| 5,684,950 | A | 11/1997 | Dare |
| 5,687,376 | A | 11/1997 | Celi, Jr. |
| 5,691,917 | A | 11/1997 | Harrison |
| 5,729,682 | A | 3/1998 | Marquis |
| 5,742,905 | A | 4/1998 | Pepe |
| 5,748,890 | A | 5/1998 | Goldberg |
| 5,754,111 | A | 5/1998 | Garcia |
| 5,754,175 | A | 5/1998 | Koppolu |
| 5,778,227 | A | 7/1998 | Jordan |
| 5,787,283 | A | 7/1998 | Chin |
| 5,787,412 | A | 7/1998 | Bosch |
| 5,787,427 | A | 7/1998 | Benantar |
| 5,790,785 | A | 8/1998 | Klug et al. |
| 5,790,790 | A | 8/1998 | Smith |
| 5,809,509 | A | 9/1998 | Blackman |
| 5,819,092 | A | 10/1998 | Ferguson et al. |
| 5,826,252 | A | 10/1998 | Wolters, Jr. |
| 5,835,722 | A | 11/1998 | Bradshaw |
| 5,862,325 | A | 1/1999 | Reed et al. |
| 5,864,848 | A | 1/1999 | Horvitz |
| 5,864,870 | A | 1/1999 | Guck |
| 5,867,712 | A | 2/1999 | Shaw |
| 5,867,799 | A | 2/1999 | Lang |
| 5,870,739 | A | 2/1999 | Davis |
| 5,870,759 | A | 2/1999 | Bauer |
| 5,872,926 | A | 2/1999 | Levac |
| 5,898,870 | A | 4/1999 | Okuda |
| 5,911,139 | A | 6/1999 | Jain |
| 5,911,143 | A | 6/1999 | Deinhart |
| 5,926,810 | A | 7/1999 | Noble |
| 5,930,801 | A | 7/1999 | Falkenhainer |
| 5,933,820 | A | 8/1999 | Beier |
| 5,937,189 | A | 8/1999 | Branson |
| 5,944,823 | A | 8/1999 | Jade |
| 5,956,715 | A | 9/1999 | Glasser |
| 5,956,730 | A | 9/1999 | Burroughs et al. |
| 5,963,976 | A | 10/1999 | Ogawa |
| 5,974,416 | A | 10/1999 | Anand et al. |
| 5,974,417 | A | 10/1999 | Bracho |
| 5,983,234 | A | 11/1999 | Tietjen |
| 5,983,273 | A | 11/1999 | White et al. |
| 5,987,454 | A | 11/1999 | Hobbs |
| 5,990,883 | A | 11/1999 | Byrne |
| 5,999,932 | A | 12/1999 | Paul |
| 6,003,079 | A | 12/1999 | Friedrich |
| 6,011,537 | A | 1/2000 | Slotznick |
| 6,016,394 | A | 1/2000 | Walker |
| 6,018,343 | A | 1/2000 | Wang et al. |
| 6,021,403 | A | 2/2000 | Horvitz |
| 6,023,223 | A | 2/2000 | Baxter, Jr. |
| 6,023,765 | A | 2/2000 | Kuhn |
| 6,044,224 | A | 3/2000 | Radia |
| 6,044,372 | A | 3/2000 | Rothfus et al. |
| 6,047,307 | A | 4/2000 | Radko |
| 6,047,327 | A | 4/2000 | Tso et al. |
| 6,049,821 | A | 4/2000 | Theriault |
| 6,052,720 | A | 4/2000 | Traversat |
| 6,065,012 | A | 5/2000 | Balsara |
| 6,078,955 | A | 6/2000 | Konno |
| 6,081,840 | A | 6/2000 | Zhao |
| 6,088,451 | A | 7/2000 | He |
| 6,088,675 | A | 7/2000 | MacKenty |
| 6,088,717 | A | 7/2000 | Reed |
| 6,092,101 | A | 7/2000 | Birrell |
| 6,101,480 | A | 8/2000 | Conmey |
| 6,106,573 | A | 8/2000 | Mahalingaiah |
| 6,119,122 | A | 9/2000 | Bunnell |
| 6,122,348 | A | 9/2000 | French-St. George et al. |
| 6,122,629 | A | 9/2000 | Walker |
| 6,134,592 | A | 10/2000 | Montulli |
| 6,141,778 | A | 10/2000 | Kane et al. |
| 6,144,996 | A | 11/2000 | Starnes |
| 6,148,290 | A | 11/2000 | Dan |
| 6,148,301 | A | 11/2000 | Rosenthal |
| 6,148,302 | A | 11/2000 | Beylin |
| 6,148,336 | A | 11/2000 | Thomas |
| 6,151,624 | A | 11/2000 | Teare |
| 6,154,876 | A | 11/2000 | Haley |
| 6,161,125 | A | 12/2000 | Traversat et al. |
| 6,161,139 | A | 12/2000 | Win et al. |
| 6,163,794 | A | 12/2000 | Lange |
| 6,167,402 | A | 12/2000 | Yeager |
| 6,167,408 | A | 12/2000 | Cannon et al. |
| 6,169,897 | B1 | 1/2001 | Kariya |
| 6,185,551 | B1 | 2/2001 | Birrell et al. |
| 6,189,032 | B1 | 2/2001 | Susaki |
| 6,192,380 | B1 | 2/2001 | Light |
| 6,192,408 | B1 | 2/2001 | Vahalia |
| 6,195,662 | B1 | 2/2001 | Ellis |
| 6,199,081 | B1 | 3/2001 | Meyerzon |
| 6,202,066 | B1 | 3/2001 | Barkley |
| 6,223,207 | B1 | 4/2001 | Lucovsky |
| 6,226,642 | B1 | 5/2001 | Beranek |
| 6,226,792 | B1 | 5/2001 | Goiffon |
| 6,243,830 | B1 | 6/2001 | Nakatsugawa |
| 6,247,026 | B1 | 6/2001 | Waldo |
| 6,253,204 | B1 | 6/2001 | Glass |
| 6,263,498 | B1 | 7/2001 | Alcorn |
| 6,266,690 | B1 | 7/2001 | Shankarappa et al. |
| 6,269,369 | B1 | 7/2001 | Robertson |
| 6,272,506 | B1 | 8/2001 | Bell |
| 6,275,824 | B1 | 8/2001 | O'Flaherty et al. |
| 6,279,111 | B1 | 8/2001 | Jensenworth |
| 6,282,548 | B1 | 8/2001 | Burner |
| 6,282,698 | B1 | 8/2001 | Baker |
| 6,282,709 | B1 | 8/2001 | Reha |
| 6,308,216 | B1 | 10/2001 | Goldszmidt |
| 6,308,273 | B1 | 10/2001 | Goertzel |
| 6,314,093 | B1 | 11/2001 | Mann |
| 6,314,447 | B1 | 11/2001 | Lea |
| 6,314,555 | B1 | 11/2001 | Ndumu |
| 6,317,131 | B2 | 11/2001 | Basso |
| 6,317,783 | B1 | 11/2001 | Freishtat et al. |
| 6,317,868 | B1 | 11/2001 | Grimm |
| 6,324,544 | B1 | 11/2001 | Alam et al. |
| 6,327,574 | B1 | 12/2001 | Kramer |
| 6,330,610 | B1 | 12/2001 | Docter |
| 6,334,151 | B1 | 12/2001 | Bolam et al. |
| 6,336,118 | B1 | 1/2002 | Hammond |
| 6,336,119 | B1 | 1/2002 | Banavar et al. |
| 6,336,147 | B1 | 1/2002 | Brownell |
| 6,343,287 | B1 | 1/2002 | Kumar et al. |
| 6,343,324 | B1 | 1/2002 | Hubis |

(56) References Cited

U.S. PATENT DOCUMENTS

| | | |
|---|---|---|
| 6,345,279 B1 | 2/2002 | Li |
| 6,349,302 B1 | 2/2002 | Aoyama |
| 6,349,307 B1 | 2/2002 | Chen |
| 6,351,744 B1 | 2/2002 | Landresse |
| 6,351,843 B1 | 2/2002 | Berkley |
| 6,356,940 B1 | 3/2002 | Short |
| 6,360,252 B1 | 3/2002 | Rudy |
| 6,370,537 B1 | 4/2002 | Gilbert |
| 6,377,952 B1 | 4/2002 | Inohara |
| 6,381,465 B1 | 4/2002 | Chern |
| 6,389,472 B1 | 5/2002 | Hughes |
| 6,397,246 B1 | 5/2002 | Wolfe |
| 6,401,085 B1 | 6/2002 | Gershman et al. |
| 6,405,191 B1 | 6/2002 | Bhatt et al. |
| 6,405,364 B1 | 6/2002 | Bowman-Amuah |
| 6,414,635 B1 | 7/2002 | Stewart et al. |
| 6,415,322 B1 | 7/2002 | Jaye |
| 6,442,549 B1 | 8/2002 | Schneider |
| 6,446,118 B1 | 9/2002 | Gottlieb |
| 6,453,317 B1 | 9/2002 | LaCost et al. |
| 6,457,066 B1 | 9/2002 | Mein et al. |
| 6,459,913 B2 | 10/2002 | Cloutier |
| 6,463,462 B1 | 10/2002 | Smith |
| 6,466,232 B1 | 10/2002 | Newell |
| 6,470,450 B1 | 10/2002 | Langford |
| 6,480,830 B1 | 11/2002 | Ford |
| 6,480,850 B1 | 11/2002 | Veldhuisen |
| 6,480,860 B1 | 11/2002 | Monday |
| 6,480,885 B1 | 11/2002 | Olivier |
| 6,487,584 B1 | 11/2002 | Bunney |
| 6,490,721 B1 | 12/2002 | Gorshkov |
| 6,505,167 B1 | 1/2003 | Horvitz |
| 6,510,439 B1 | 1/2003 | Rangarajan |
| 6,516,315 B1 | 2/2003 | Gupta |
| 6,516,341 B2 | 2/2003 | Shaw et al. |
| 6,519,571 B1 | 2/2003 | Guheen |
| 6,526,438 B1 | 2/2003 | Bienvenu et al. |
| 6,539,481 B1 | 3/2003 | Takahashi |
| 6,542,515 B1 | 4/2003 | Kumar |
| 6,542,845 B1 | 4/2003 | Grucci |
| 6,542,912 B2 | 4/2003 | Meltzer |
| 6,542,923 B2 | 4/2003 | Nguyen |
| 6,543,317 B1 | 4/2003 | Rinner |
| 6,553,427 B1 | 4/2003 | Chang |
| 6,556,995 B1 | 4/2003 | Child et al. |
| 6,566,995 B2 | 5/2003 | Furuuchi |
| 6,571,279 B1 | 5/2003 | Herz |
| 6,574,631 B1 | 6/2003 | Subramanian |
| 6,574,655 B1 | 6/2003 | Libert |
| 6,581,095 B1 | 6/2003 | Kim |
| 6,584,564 B2 | 6/2003 | Olkin et al. |
| 6,591,260 B1 | 7/2003 | Schwarzhoff et al. |
| 6,594,666 B1 | 7/2003 | Biswas |
| 6,594,672 B1 | 7/2003 | Lampson |
| 6,601,016 B1 | 7/2003 | Brown |
| 6,601,075 B1 | 7/2003 | Huang |
| 6,601,233 B1 | 7/2003 | Underwood |
| 6,604,099 B1 | 8/2003 | Chung |
| 6,604,143 B1 | 8/2003 | Nagar |
| 6,604,209 B1 | 8/2003 | Grucci |
| 6,609,148 B1 | 8/2003 | Salo |
| 6,618,716 B1 | 9/2003 | Horvitz |
| 6,622,160 B1 | 9/2003 | Horvitz |
| 6,633,898 B1 | 10/2003 | Seguchi |
| 6,643,650 B1 | 11/2003 | Slaughter et al. |
| 6,643,652 B2 | 11/2003 | Helgeson et al. |
| 6,651,217 B1 | 11/2003 | Kennedy et al. |
| 6,654,747 B1 | 11/2003 | Van Huben |
| 6,662,340 B2 | 12/2003 | Rawat et al. |
| 6,662,357 B1 | 12/2003 | Bowman-Amuah |
| 6,665,756 B2 | 12/2003 | Abramson |
| 6,678,682 B1 | 1/2004 | Jenkins |
| 6,678,715 B1 | 1/2004 | Ando |
| 6,684,204 B1 | 1/2004 | Lal |
| 6,686,838 B1 | 2/2004 | Rezvani |
| 6,694,429 B1 | 2/2004 | Kalmanek, Jr. |
| 6,697,809 B2 | 2/2004 | Chen |
| 6,697,865 B1 | 2/2004 | Howard et al. |
| 6,704,024 B2 | 3/2004 | Robotham |
| 6,708,137 B2 | 3/2004 | Carley |
| 6,708,217 B1 | 3/2004 | Colson |
| 6,711,585 B1 | 3/2004 | Copperman |
| 6,711,612 B1 | 3/2004 | Blumenau |
| 6,714,967 B1 | 3/2004 | Horvitz |
| 6,718,535 B1 | 4/2004 | Underwood |
| 6,721,941 B1 | 4/2004 | Morshed |
| 6,731,940 B1 | 5/2004 | Nagendran |
| 6,732,080 B1 | 5/2004 | Blants |
| 6,738,767 B1 | 5/2004 | Chung |
| 6,741,980 B1 | 5/2004 | Langseth et al. |
| 6,745,011 B1 | 6/2004 | Hendrickson |
| 6,748,417 B1 | 6/2004 | Helland |
| 6,754,470 B2 | 6/2004 | Hendrickson |
| 6,757,720 B1 | 6/2004 | Weschler |
| 6,757,898 B1 | 6/2004 | Ilsen |
| 6,763,384 B1 | 7/2004 | Gupta |
| 6,766,362 B1 | 7/2004 | Miyasaka et al. |
| 6,772,216 B1 | 8/2004 | Ankireddipally |
| 6,789,077 B1 | 9/2004 | Slaughter |
| 6,789,126 B1 | 9/2004 | Saulpaugh et al. |
| 6,792,446 B2 | 9/2004 | Merchant |
| 6,792,466 B1 | 9/2004 | Saulpaugh et al. |
| 6,792,605 B1 | 9/2004 | Roberts |
| 6,807,558 B1 | 10/2004 | Hassett |
| 6,816,878 B1 | 11/2004 | Zimmers |
| 6,816,886 B2 | 11/2004 | Elvanoglu |
| 6,820,082 B1 | 11/2004 | Cook |
| 6,820,204 B1 | 11/2004 | Desai |
| 6,823,369 B2 | 11/2004 | Leach |
| 6,823,458 B1 | 11/2004 | Lee |
| 6,823,495 B1 | 11/2004 | Vedula |
| 6,829,593 B1 | 12/2004 | Ritter |
| 6,832,237 B1 | 12/2004 | Christensen |
| 6,839,733 B1 | 1/2005 | Lange et al. |
| 6,850,975 B1 | 2/2005 | Danneels |
| 6,850,979 B1 | 2/2005 | Saulpaugh |
| 6,857,013 B2 | 2/2005 | Ramberg |
| 6,862,594 B1 | 3/2005 | Saulpaugh |
| 6,868,447 B1 | 3/2005 | Slaughter |
| 6,882,706 B2 | 4/2005 | Andrew |
| 6,892,201 B2 | 5/2005 | Brown |
| 6,898,618 B1 | 5/2005 | Slaughter |
| 6,907,457 B2 | 6/2005 | Merrell |
| 6,907,465 B1 | 6/2005 | Tsai |
| 6,911,143 B2 | 6/2005 | Janik |
| 6,912,600 B2 | 6/2005 | Van Brero |
| 6,917,373 B2 | 7/2005 | Vong |
| 6,917,937 B1 | 7/2005 | Rubendall |
| 6,917,976 B1 | 7/2005 | Slaughter |
| 6,918,084 B1 | 7/2005 | Slaughter |
| 6,925,307 B1 | 8/2005 | Mamdani |
| 6,925,481 B2 | 8/2005 | Singhal |
| 6,931,434 B1 | 8/2005 | Donoho |
| 6,934,740 B1 | 8/2005 | Lawande |
| 6,944,658 B1 | 9/2005 | Schneider |
| 6,957,199 B1 | 10/2005 | Fisher |
| 6,958,984 B2 | 10/2005 | Kotzin |
| 6,976,078 B1 | 12/2005 | Icken |
| 6,980,993 B2 | 12/2005 | Horvitz et al. |
| 6,981,247 B2 | 12/2005 | Weinberg |
| 6,985,958 B2 | 1/2006 | Lucovsky |
| 6,986,145 B2 | 1/2006 | Gangopadhyay |
| 6,990,513 B2 | 1/2006 | Belfiore |
| 6,993,502 B1 | 1/2006 | Gryglewicz |
| 7,002,942 B2 | 2/2006 | Kotzin |
| 7,017,016 B2 | 3/2006 | Chujo |
| 7,024,662 B2 | 4/2006 | Elvanoglu |
| 7,024,692 B1 | 4/2006 | Schanze |
| 7,027,051 B2 | 4/2006 | Alford |
| 7,028,312 B1 | 4/2006 | Merrick |
| 7,031,945 B1 | 4/2006 | Donner |
| 7,061,928 B2 | 6/2006 | Giroti |
| 7,062,539 B2 | 6/2006 | Leach |
| 7,062,642 B1 | 6/2006 | Langrind |

(56) References Cited

U.S. PATENT DOCUMENTS

| | | |
|---|---|---|
| 7,069,446 B2 | 6/2006 | Wiederin |
| 7,072,843 B2 | 7/2006 | Menninger |
| 7,072,967 B1 | 7/2006 | Saulpaugh |
| 7,113,771 B2 | 9/2006 | Kotzin |
| 7,127,328 B2 | 10/2006 | Ransom |
| 7,127,514 B2 | 10/2006 | Hunt |
| 7,133,869 B2 | 11/2006 | Bryan et al. |
| 7,136,859 B2 | 11/2006 | Lucovsky |
| 7,136,908 B2 | 11/2006 | Cline |
| 7,143,118 B2 | 11/2006 | Eichstaedt et al. |
| 7,149,806 B2 | 12/2006 | Perkins |
| 7,170,857 B2 | 1/2007 | Stephens |
| 7,191,236 B2 | 3/2007 | Simpson-Young |
| 7,203,906 B2 | 4/2007 | Abbott |
| 7,206,788 B2 | 4/2007 | Horvitz |
| 7,207,008 B1 | 4/2007 | Koch |
| 7,210,147 B1 | 4/2007 | Hipp |
| 7,216,287 B2 | 5/2007 | Colson |
| 7,219,163 B2 | 5/2007 | Robinson |
| 7,222,306 B2 | 5/2007 | Kaasila |
| 7,243,130 B2 | 7/2007 | Horvitz |
| 7,246,122 B2 | 7/2007 | Lucovsky |
| 7,249,159 B1 | 7/2007 | Horvitz |
| 7,250,846 B2 | 7/2007 | Ebling |
| 7,260,601 B1* | 8/2007 | Day et al. ............... 709/203 |
| 7,277,951 B2 | 10/2007 | Marriott |
| 7,284,197 B2 | 10/2007 | Lucovsky |
| 7,284,271 B2 | 10/2007 | Lucovsky |
| 7,302,402 B2 | 11/2007 | Callaghan |
| 7,346,668 B2 | 3/2008 | Willis |
| 7,418,472 B2 | 8/2008 | Shoemaker |
| 7,457,879 B2 | 11/2008 | Horvitz |
| 7,472,349 B1 | 12/2008 | Srivastava |
| 7,487,233 B2 | 2/2009 | Iwamoto |
| 7,496,630 B2 | 2/2009 | Arellano |
| 7,502,384 B2 | 3/2009 | Trossen |
| 7,539,747 B2 | 5/2009 | Lucovsky |
| 7,545,762 B1 | 6/2009 | McConnell |
| 7,548,932 B2 | 6/2009 | Horvitz |
| 7,613,702 B2 | 11/2009 | Horvitz |
| 7,613,721 B2 | 11/2009 | Horvitz |
| 7,613,722 B2 | 11/2009 | Horvitz |
| 7,664,724 B2 | 2/2010 | Lucovsky |
| 7,721,110 B2 | 5/2010 | Kouznetsov |
| 7,921,155 B2 | 4/2011 | Harrow |
| 8,572,576 B2 | 10/2013 | Elvanoglu |
| 8,862,736 B2 | 10/2014 | Tagg |
| 2001/0000958 A1 | 5/2001 | Ulrich |
| 2001/0023421 A1 | 9/2001 | Numao |
| 2001/0029470 A1 | 10/2001 | Schultz et al. |
| 2001/0044275 A1 | 11/2001 | Yamaguchi |
| 2001/0044827 A1 | 11/2001 | Zhuk |
| 2001/0047385 A1 | 11/2001 | Tuatini |
| 2002/0010781 A1 | 1/2002 | Tuatini |
| 2002/0012327 A1* | 1/2002 | Okada ..................... 370/328 |
| 2002/0013711 A1 | 1/2002 | Ahuja |
| 2002/0013788 A1 | 1/2002 | Pennell et al. |
| 2002/0015042 A1 | 2/2002 | Robotham |
| 2002/0016173 A1 | 2/2002 | Hunzinger |
| 2002/0019828 A1 | 2/2002 | Mortl |
| 2002/0023156 A1 | 2/2002 | Chujo |
| 2002/0026426 A1 | 2/2002 | Bennett |
| 2002/0029256 A1 | 3/2002 | Zintel |
| 2002/0032790 A1 | 3/2002 | Linderman |
| 2002/0035533 A1 | 3/2002 | Mache |
| 2002/0038455 A1* | 3/2002 | Srinivasan et al. ............. 725/35 |
| 2002/0040369 A1 | 4/2002 | Multer et al. |
| 2002/0042846 A1 | 4/2002 | Bottan et al. |
| 2002/0049749 A1 | 4/2002 | Helgeson et al. |
| 2002/0049817 A1 | 4/2002 | Drory |
| 2002/0049902 A1* | 4/2002 | Rhodes .................... 713/153 |
| 2002/0055951 A1 | 5/2002 | Shigetomi |
| 2002/0059342 A1 | 5/2002 | Gupta |
| 2002/0059425 A1 | 5/2002 | Belfiore |
| 2002/0063732 A1 | 5/2002 | Mansikkaniemi et al. |
| 2002/0065881 A1 | 5/2002 | Mansikkaniemi et al. |
| 2002/0065884 A1 | 5/2002 | Donoho et al. |
| 2002/0069298 A1 | 6/2002 | Birkler et al. |
| 2002/0073158 A1 | 6/2002 | Dalal |
| 2002/0073204 A1 | 6/2002 | Dutta |
| 2002/0078378 A1 | 6/2002 | Burnett |
| 2002/0080156 A1 | 6/2002 | Abbott |
| 2002/0080948 A1 | 6/2002 | Canali |
| 2002/0083048 A1 | 6/2002 | Tenorio |
| 2002/0083073 A1 | 6/2002 | Vaidya |
| 2002/0083121 A1 | 6/2002 | Chang |
| 2002/0083158 A1 | 6/2002 | Abbott |
| 2002/0085579 A1 | 7/2002 | Sullivan |
| 2002/0087397 A1 | 7/2002 | Mazza |
| 2002/0087740 A1 | 7/2002 | Castanho |
| 2002/0090934 A1 | 7/2002 | Mitchelmore |
| 2002/0095399 A1 | 7/2002 | Devine et al. |
| 2002/0099573 A1 | 7/2002 | Koguchi |
| 2002/0099593 A1 | 7/2002 | Kraft et al. |
| 2002/0099817 A1 | 7/2002 | Abbott |
| 2002/0103661 A1 | 8/2002 | Albazz |
| 2002/0104017 A1 | 8/2002 | Stefan |
| 2002/0107985 A1 | 8/2002 | Hwang et al. |
| 2002/0116232 A1 | 8/2002 | Rapp et al. |
| 2002/0116642 A1 | 8/2002 | Joshi |
| 2002/0120685 A1 | 8/2002 | Srivastava et al. |
| 2002/0120711 A1 | 8/2002 | Bantz |
| 2002/0124182 A1 | 9/2002 | Bacso et al. |
| 2002/0129000 A1 | 9/2002 | Pillai et al. |
| 2002/0129016 A1 | 9/2002 | Christfort |
| 2002/0129024 A1 | 9/2002 | Lee |
| 2002/0129140 A1 | 9/2002 | Peled |
| 2002/0129213 A1* | 9/2002 | Goudie et al. ............... 711/154 |
| 2002/0131428 A1* | 9/2002 | Pecus et al. ................ 370/401 |
| 2002/0133477 A1* | 9/2002 | Abel ........................ 707/1 |
| 2002/0133506 A1* | 9/2002 | Yamato .................... 707/104.1 |
| 2002/0133535 A1 | 9/2002 | Lucovsky |
| 2002/0133627 A1 | 9/2002 | Maes |
| 2002/0133752 A1 | 9/2002 | Hand |
| 2002/0152053 A1 | 10/2002 | Roy |
| 2002/0154161 A1 | 10/2002 | Friedman et al. |
| 2002/0157007 A1 | 10/2002 | Sashihara |
| 2002/0161838 A1* | 10/2002 | Pickover et al. ............. 709/204 |
| 2002/0169876 A1 | 11/2002 | Curie et al. |
| 2002/0174125 A1 | 11/2002 | Lucovsky |
| 2002/0184092 A1 | 12/2002 | Cherry et al. |
| 2002/0184214 A1 | 12/2002 | Lucovsky |
| 2002/0184344 A1 | 12/2002 | Elvanoglu |
| 2002/0184521 A1 | 12/2002 | Lucovsky |
| 2003/0004874 A1 | 1/2003 | Ludwig |
| 2003/0014659 A1 | 1/2003 | Zhu |
| 2003/0018771 A1 | 1/2003 | Vinberg |
| 2003/0023263 A1 | 1/2003 | Krolik |
| 2003/0023623 A1 | 1/2003 | Horvitz et al. |
| 2003/0041000 A1 | 2/2003 | Zajac |
| 2003/0041065 A1 | 2/2003 | Lucovsky |
| 2003/0041076 A1 | 2/2003 | Lucovsky |
| 2003/0046238 A1* | 3/2003 | Nonaka et al. ............... 705/51 |
| 2003/0050911 A1 | 3/2003 | Lucovsky |
| 2003/0055897 A1 | 3/2003 | Brown |
| 2003/0061081 A1 | 3/2003 | Kellond |
| 2003/0061211 A1 | 3/2003 | Shultz |
| 2003/0061365 A1 | 3/2003 | White |
| 2003/0069887 A1 | 4/2003 | Lucovsky |
| 2003/0074247 A1 | 4/2003 | Dick |
| 2003/0074423 A1 | 4/2003 | Mayberry |
| 2003/0097485 A1 | 5/2003 | Horvitz et al. |
| 2003/0100326 A1 | 5/2003 | Grube |
| 2003/0101190 A1 | 5/2003 | Horvitz et al. |
| 2003/0110234 A1 | 6/2003 | Egli |
| 2003/0115228 A1 | 6/2003 | Horvitz et al. |
| 2003/0120785 A1 | 6/2003 | Young |
| 2003/0123465 A1 | 7/2003 | Donahue |
| 2003/0131069 A1 | 7/2003 | Lucovsky et al. |
| 2003/0131073 A1 | 7/2003 | Lucovsky et al. |
| 2003/0131142 A1* | 7/2003 | Horvitz et al. ............. 709/313 |
| 2003/0133553 A1 | 7/2003 | Khakoo |
| 2003/0135411 A1 | 7/2003 | Ushiki |
| 2003/0135441 A1 | 7/2003 | Ginsberg |

(56) References Cited

U.S. PATENT DOCUMENTS

| | | |
|---|---|---|
| 2003/0135556 A1 | 7/2003 | Holdsworth |
| 2003/0140112 A1 | 7/2003 | Ramachandran et al. |
| 2003/0149646 A1 | 8/2003 | Chen |
| 2003/0149696 A1 | 8/2003 | Nelson |
| 2003/0149781 A1 | 8/2003 | Yared |
| 2003/0154476 A1 | 8/2003 | Abbott |
| 2003/0165139 A1 | 9/2003 | Chen |
| 2003/0167334 A1 | 9/2003 | Butler |
| 2003/0169749 A1 | 9/2003 | Huang |
| 2003/0177135 A1 | 9/2003 | Lechowicz |
| 2003/0220891 A1 | 11/2003 | Fish |
| 2003/0221014 A1 | 11/2003 | Kosiba |
| 2003/0223449 A1 | 12/2003 | Hill |
| 2003/0229529 A1 | 12/2003 | Mui et al. |
| 2004/0002972 A1 | 1/2004 | Pather |
| 2004/0002976 A1 | 1/2004 | Lucovsky |
| 2004/0003112 A1 | 1/2004 | Alles |
| 2004/0006564 A1 | 1/2004 | Lucovsky et al. |
| 2004/0006590 A1 | 1/2004 | Lucovsky et al. |
| 2004/0010451 A1 | 1/2004 | Romano |
| 2004/0015725 A1 | 1/2004 | Boneh |
| 2004/0024866 A1 | 2/2004 | Sundar |
| 2004/0024875 A1 | 2/2004 | Horvitz et al. |
| 2004/0060002 A1 | 3/2004 | Lucovsky et al. |
| 2004/0064571 A1 | 4/2004 | Nuuttila |
| 2004/0078273 A1 | 4/2004 | Loeb |
| 2004/0083291 A1 | 4/2004 | Pessi |
| 2004/0098622 A1 | 5/2004 | O'Neill |
| 2004/0133622 A1 | 7/2004 | Clubb |
| 2004/0139145 A1 | 7/2004 | Bar-or |
| 2004/0156346 A1 | 8/2004 | O'Neill |
| 2004/0166834 A1 | 8/2004 | Omar |
| 2004/0181550 A1 | 9/2004 | Warsta |
| 2004/0193444 A1 | 9/2004 | Hufford |
| 2004/0199663 A1 | 10/2004 | Horvitz et al. |
| 2004/0199664 A1* | 10/2004 | Feldman et al. ............... 709/238 |
| 2004/0199861 A1 | 10/2004 | Lucovsky |
| 2004/0199869 A1 | 10/2004 | Lucovsky et al. |
| 2004/0205526 A1 | 10/2004 | Borodovski et al. |
| 2004/0205656 A1 | 10/2004 | Reulein |
| 2004/0210839 A1 | 10/2004 | Lucovsky |
| 2004/0226001 A1 | 11/2004 | Teegan |
| 2004/0242322 A1 | 12/2004 | Montagna |
| 2004/0243520 A1 | 12/2004 | Bishop |
| 2004/0267687 A1 | 12/2004 | Aschen |
| 2004/0267763 A1 | 12/2004 | Aschen |
| 2004/0267965 A1 | 12/2004 | Vasudevan |
| 2005/0013417 A1 | 1/2005 | Zimmers et al. |
| 2005/0027741 A1 | 2/2005 | Eichstaedt et al. |
| 2005/0065950 A1 | 3/2005 | Chaganti et al. |
| 2005/0080865 A1 | 4/2005 | Leach |
| 2005/0080911 A1 | 4/2005 | Stiers |
| 2005/0097000 A1 | 5/2005 | Freishtat |
| 2005/0100150 A1 | 5/2005 | Dhara |
| 2005/0144266 A1 | 6/2005 | Antonelli |
| 2005/0165773 A1 | 7/2005 | Elvanoglu |
| 2005/0262434 A1 | 11/2005 | Soderberg |
| 2005/0273692 A1 | 12/2005 | Horvitz et al. |
| 2005/0278344 A1 | 12/2005 | Horvitz et al. |
| 2005/0278366 A1 | 12/2005 | Horvitz et al. |
| 2005/0289447 A1 | 12/2005 | Hadley |
| 2006/0003780 A1 | 1/2006 | Mamdani |
| 2006/0010078 A1 | 1/2006 | Rezvani |
| 2006/0036642 A1 | 2/2006 | Horvitz et al. |
| 2006/0107251 A1 | 5/2006 | Boshier |
| 2006/0133385 A1 | 6/2006 | Trossen |
| 2006/0150140 A1 | 7/2006 | Elvanoglu |
| 2006/0161554 A1 | 7/2006 | Lucovsky |
| 2007/0026857 A1 | 2/2007 | Kotzin |
| 2007/0083561 A1 | 4/2007 | Lai |
| 2007/0150903 A1 | 6/2007 | Hansen |
| 2007/0198691 A1 | 8/2007 | Koch |
| 2007/0216687 A1 | 9/2007 | Kaasila |

FOREIGN PATENT DOCUMENTS

| | | |
|---|---|---|
| EP | 0893920 | 1/1999 |
| EP | 0917119 | 5/1999 |
| EP | 0952513 | 10/1999 |
| EP | 0991005 | 4/2000 |
| EP | 1021021 | 7/2000 |
| EP | 1376977 | 8/2007 |
| JP | 11-143827 A | 5/1999 |
| JP | 2000163345 | 6/2000 |
| JP | 2002055896 | 2/2002 |
| JP | 2004501428 | 1/2004 |
| JP | 2004508611 | 3/2004 |
| NO | 329278 | 9/2010 |
| WO | WO 9741654 | 11/1997 |
| WO | WO 9838585 | 9/1998 |
| WO | WO 9917216 | 4/1999 |
| WO | 99/23591 A1 | 5/1999 |
| WO | WO 9923591 | 5/1999 |
| WO | WO 0051031 | 8/2000 |
| WO | WO 02073339 | 9/2002 |
| WO | WO 02073392 | 9/2002 |
| WO | WO 02073442 | 9/2002 |
| WO | WO 02073454 | 9/2002 |
| WO | WO 02073466 | 9/2002 |
| WO | WO 02073472 | 9/2002 |
| WO | WO 02079921 | 10/2002 |
| WO | WO 03096209 | 11/2003 |

OTHER PUBLICATIONS

Bergman, "XML Technology Enables Redesigned Deep Space Network Operations," IEEE, Mar. 2000, pp. 493-502.

Morrison, et al., "XML Unleashed," Sam's Publishing, Indianapolis, IN, Dec. 1999, pp. 26-37, 84-104, & 106-122.

Padwick, Special Edition, "Using Microsoft outlook 2000," Que Corporation, Indianapolis, IN, May 1999, pp. 370-376, 382-386, & 392-396.

"Hailstorm Announcement," Bill Gates' Speech, Mar. 19, 2001, pp. 1-25, downloaded from www.microsoft.com/billgates/speeches/2001/03-19hailstorm.asp.

"Getting Results with Microsoft Office 97," Microsoft, 1997, pp. 28-31, 345-374, & 470-471.

Stallings, "Cryptography and Network Security" Prentice Hall, Inc., 1998, Chapter 11.

He et al., "A role-Based Access Control Model for XML Repositories," IEEE, 2000, pp. 138-145.

Box et al., "Simple Object Access Protocol (SOAP) 1.1 W3C Note May 8, 2000," pp. 1-35.

Dix et al., "Working with SOAP, the Simple Object Access Protocol," C/C++ user Journal, Jan. 2002, pp. 22-33.

Wang et al., "The SIMBA User Alert Service Architecture for Dependable Alert Delivery," Proceedings of the International Conference on Dependable Systems and Networks, 2001, pp. 463-472, Institute of Electrical and Electronics Engineers, Inc., U.S.A.

Miller et al., "News On-Demand for Multimedia Networks," Proceedings of the First ACM International Conference on Multimedia, 1993, pp. 383-392, ACM Press, New York, U.S.A.

Faensen et al., "Hermes: A Notification Service for Digital Libraries," Proceedings of the First ACM/IEEE-CS Joint Conference on Digital Libraries, 2001, pp. 373-380, ACM Press, New York, U.S.A.

Huang et al., "Publish/Subscribe in a Mobile Environment," Second ACM International Workshop on Data Engineering for Wireless and Mobile Access, 2001, pp. 27-34, ACM Press, New York, U.S.A.

Search Report Ref 3071, for Application No. PCT/US02/07953, mailed Jun. 10, 2002.

EP "Communication", Reference EP 28364-03/df, for Application No. 02 719 261.6 1244, May 2, 2008.

EP "Supplemental Search Report", Reference EP 25448-034/zp, for Application No. 02728381.1-1244 PCT/USS02/06244, Feb. 5, 2007.

EP "Communication", Reference EP 25450-034/zp, for Application No. 02 709 743.5-1225, Jun. 13, 2007.

Phelps, "MultiVaient Documents", Communications of the ACM, Jun. 2000.

(56) References Cited

OTHER PUBLICATIONS

"International Search Report", Reference 3231, for Application No. PCT/US02/08061, Aug. 22, 2002.
Vuong, "Managing Security Policies in a Distributed Environment Using eXtensible Markup Language (XML)", 2001.
"CORBA Components—vol. I", OMG, Aug. 2, 1999.
Farjami, "Advanced Service Provisioning Based on Mobile Agents", Aachen University of Technology, Germany, Apr. 2000.
Kormann, "Risks of the Passport Single Signon Protocol", Computer Networks, May 2000.
Magedanz, "TINA—Architectural Basis for Future Telecommunications Services", Computer Communications, Jun. 28, 1996.
Ayers, "XML for Resource Scheduling / Calendar Management", Nov. 8, 1998.
Carroll, "XML for Resource Scheduling / Calendar Management", Nov. 6, 1998.
Eustice, "A Universal Information Appitance", IBM Systems Journal, Mar. 26, 1999.
Koppen, "Active Hypertext for Distributed Web Applications", IEEE WET-ICE'99, Jun. 16, 1999.
"Microsoft Outlook 2000 Step by Step", Microsoft Press, 1999.
"Getting Results with Microsoft Office 97", Microsoft Press, 1997, pp. 429, and 519-523.
Freire, "WebViews: Accessing Personalized Web Content and Services", WWW10, May 1, 2001.
"Saflink's JotterSAF E-Wallet & Privacy Software Now Available for Consumer Download", PR Newswire, Feb. 7, 2001.
"ScanSofts New OmniForm Premium 5.0 to Offer Businesses Powerful Forms Management", M2 Presswire, Oct. 16, 2001.
"ScanSoft's New OmniForm Premium 5.0 to Offer Businesses Powerful Forms Management", Nuance Press Release, Oct. 1, 2001.
Chu, "Web-Based Single Sign-On Solutions: An SSO Product Matrix", Computer Security Journal, Nov. 1, 2000.
Cook, "The Win2000 Active Directory", PC Network Advisor, Jun. 2000.
Ferreira, "Using LDAP in a Filtering Service for a Digital Library", IST, 1997.
Roussev, "Integrating XML and Object-based Programming for Distributed Collaboration", University of North Carolina, Jun. 2000.
Spencer, "Installing and Configuring Active Directory", Prentice Hall PTR, May 2000.
DK Search Report for Application No. SG 200302729-9, Mar. 15, 2004.
HU Advisory Action for Application No. P0301952, Apr. 7, 2011.
ID Official Action for Application No. P00200300319, May 5, 2011.
PL Notice for Application No. P.360329/DP, May 25, 2010.
TR Search Report for Application No. 2003/00789, Nov. 14, 2004.
EP Intent to Grant for Application No. 02725195.8, Aug. 12, 2011.
EP Communication for Application No. 03009717.4, Sep. 12, 2005.
EP Supplemental European Search Report for Application No. 02709743.5, PCT/US02/06243, Sep. 5, 2006.
EP Supplemental European Search Report for Application No. 02721433.7, PCT/US02/07953, Aug. 13, 2009.
PCT International Search Report for Application No. PCT/US02/06245, May 30, 2002.
PCT International Search Report for Application No. PCT/US02/08063, May 30, 2002.
PCT international Search Report for Application No. PCT/US02/07953, Jun. 10, 2002.
PCT International Search Report for Application No. PCT/US02/06243, May 7, 2002.
"Identity-Based Service Communication Using XML Messaging Interfaces", Mar. 14, 2001.
EP Search Report for Application No. 03009717.4, Dec. 2, 2003.
EP Summons to Attend or Proceedings for Application No. 03009717.4, Oct. 18, 2006.
NZ Examination Report for Application No. 525694, May 12, 2003.
JP Notice of Rejection for Application No. 2003-164094, May 23, 2008.
JP Notice of Rejection for Application No. 2003-164094, Mar. 17, 2009.
EP Supplementary European Search Report for Application No. 02707934.2, PCT/US02/06245, Jun. 7, 2006.
EP Supplementary Search Report for Application No. 02719261.6, PCT/US02/08063, Feb. 5, 2007.
EP Supplementary Search Report for Application No. 02709753.4, PCT/US02/06329, Feb. 13, 2007.
EP Supplementary Search Report for Application No. 02725195.8, PCT/US02/08061, Aug. 4, 2009.
Phelps, "Multivalent Documents: A New Model for Digital Documents", UC Berkeley, 1998.
CA Notice of Requisition for Application No. 2428481, Apr. 2, 2009.
AU First Report for Application No. 2003204123, Oct. 27, 2008.
CN Office Action for Application No. 03145733.9 Dec. 30, 2005.
CN Second Office Action for Application No. 03145733.9, Nov. 2, 2007.
CN Third Office Action for Application No. 03145733.9, Aug. 22, 2008.
NO Official Action for Application No. 20032997, Dec. 23, 2008.
MY Search Report for Application No. PI20031685, Jul. 20, 2007.
ID Official Action for Application No. P00200300319, Mar. 3, 2006.
TR Examination Report for Application No. 2003/00769, Jun. 13, 2007.
TR Examination Report for Application No. 2003/00769, Oct. 15, 2008.
TR Examination Report for Application No. 2003/00769, Nov. 24, 2009.
HU Novelty Search Report Application No. P0301952, Mar. 30, 2005.
Barish, Untangling the web, SOAP uses XML as a simple and elegant solution that automates B2B transactions. Intelligent Enterprise, Mar. 27, 2001.
Caswell, An Evolution of DCE Authorization Services. Hewlett-Packard Journal, Dec. 1995.
Chandramouli, Application of XML Tools for Enterprise-Wide RBAC Implementation Tasks. RBAC '00 Proceedings of the fifth ACM workshop on Role-based access control. 2000.
Hou, Object-Oriented Representation for XML Data. 2001.
Jepsen, SOAP Cleans up Interoperability Problems on the Web. IT Pro, Jan.-Feb. 2001.
Jerbic, Security Requirements for Web-Services, Hewlett Packard Position Paper to the Worldwide Web Consortium Workshop on Web Services, Apr. 11-12, 2001.
Lowry, XML Data Mediation and Collaboration: A Proposed Comprehensive Architecture and Query Requirements for Using XML to Mediate Heterogeneous Data Sources and Targets. Proceedings of the 34th Hawaii International Conference on System Sciences, Jan. 3-6, 2001.
SOAP Version 1.2 Part 1: Messaging Framework. W3C Working Draft Oct. 2, 2001.
SOAP Version 1.2 Part 2: Adjuncts. W3C Working Draft Oct. 2, 2001.
XML Path Language (XPath) Version 1,0. W3C Recommendation Nov. 16, 1999.
DNJ Online, Essentials—Understanding XPath, X marks the path. 2001.
EP Communication for Application No. 02 707 934.2-1244, Reference EP25451-034/gr, Jan. 23, 2007.
EP Communication for Application No. 02 709 743.5-1225, Reference EP25450-034/zp, Jun. 13, 2007.
EP Communication for Application No. 02 719 261.6-1244, Reference EP28364-034/df, May 2, 2008.
EP Communication for Application No. 02 709 753.4-1244, Reference EP25449-034/gr, May 9, 2008.
EP Communication for Application No. 02 709 743.5-1225, Reference EP25450-034/zp, Apr. 21, 2009.
EP Communication for Application No. 02 721 433.7-1244, Reference EP28368-034/df, Oct. 16, 2009.
EP Communication for Application No. 02 725 195.8-1244, Reference EP28367 -034/df, Oct. 30, 2009.

(56) References Cited

OTHER PUBLICATIONS

EP Communication for Application No. 02 721 433.7-1244, Reference EP28368-034/df, Aug. 23, 2011.
Reinwlad, Heterogeneous Query Processing through SQL Table Functions. Data Engineering, Proceedings of 15th International Conference on Sydney, Australia. Mar. 23, 1999.
Stamoulis, Efficient Agent-Based Negotiation for Telecommunications Services. Global Telecommunications Conference. Globecom '99. 1999.
Li, "What You See Is What I Saw: Applications of Stateless Client Systems in Asynchronous CSCW", In Proceedings of the 4th International Conference on Computer Science and Informatics, 1998.
Nielsen, "Web Services Routing Protocol (WS-Routing)", Microsoft Corporation, Oct. 23, 2001.
U.S. Appl. No. 10/696,916, filed Oct. 30, 2003, Lai.
U.S. Appl. No. 10/717,880, filed Nov. 20, 2003, Orvendal.
U.S. Appl. No. 10/718,305, filed Nov. 20, 2003, Nguyen.
U.S. Appl. No. 60/275,809, filed Mar. 14, 2001, Lucovsky.
U.S. Appl. No. 10/003,754, filed Oct. 22, 2001, Lucovsky.
U.S. Appl. No. 10/003,750, filed Oct. 22, 2001, Lucovsky.
U.S. Appl. No. 10/003,753, filed Oct. 22, 2001, Lucovsky.
U.S. Appl. No. 10/136,555, filed May 1, 2002, Elvanoglu.
U.S. Appl. No. 10/003,767, filed Oct. 22, 2001, Lucovsky.
U.S. Appl. No. 10/021,563, filed Oct. 22, 2001, Lucovsky.
U.S. Appl. No. 10/021,264, filed Oct. 22, 2001, Lucovsky.
U.S. Appl. No. 10/021,316, filed Oct. 22, 2001, Lucovsky.
U.S. Appl. No. 10/021,291, filed Oct. 22, 2001, Lucovsky.
U.S. Appl. No. 10/209,831, filed Jul. 31, 2002, Lucovsky.
U.S. Appl. No. 10/187,061, filed Jun. 28, 2002, Lucovsky.
U.S. Appl. No. 10/062,045, filed Jan. 31, 2002, Elvanoglu.
U.S. Appl. No. 10/017,680, filed Oct. 22, 2001, Lucovsky.
U.S. Appl. No. 10/033,177, filed Oct. 22, 2001, White.
U.S. Appl. No. 10/187,196, filed Jun. 28, 2002, Horvitz.
U.S. Appl. No. 10/187,063, filed Jun. 28, 2002, Horvitz.
U.S. Appl. No. 10/243,310, filed Sep. 12, 2002, Lucovsky.
U.S. Appl. No. 10/187,057, filed Jun. 28, 2002, Lucovsky.
U.S. Appl. No. 10/187,190, filed Jun. 28, 2002, Lucovsky.
U.S. Appl. No. 10/213,525, filed Aug. 6, 2002, Lucovsky.
U.S. Appl. No. 10/187,210, filed Jun. 28, 2002, Lucovsky.
U.S. Appl. No. 10/099,467, filed Mar. 14, 2002, Horvitz.
U.S. Appl. No. 10/099,577, filed Mar. 14, 2002, Leach.
U.S. Appl. No. 10/186,881, filed Jun. 28, 2002, Lucovsky.
U.S. Appl. No. 10/187,216, filed Jun. 28, 2002, Horvitz.
U.S. Appl. No. 10/177,470, filed Jun. 21, 2002, Elvanoglu.
U.S. Appl. No. 10/968,731, filed Oct. 19, 2004, Leach.
U.S. Appl. No. 11/276,655, filed Mar. 9, 2006, Lucovsky.
U.S. Appl. No. 11/086,590, filed Mar. 21, 2005, Elvanoglu.
U.S. Appl. No. 11/203,482, filed Aug. 12, 2005, Horvitz.
U.S. Appl. No. 11/203,485, filed Aug. 12, 2005, Horvitz.
U.S. Appl. No. 11/203,490, filed Aug. 12, 2005, Horvitz.
U.S. Appl. No. 11/203,484, filed Aug. 12, 2005, Horvitz.
U.S. Appl. No. 11/347,448, filed Feb. 3, 2006, Elvanoglu.
U.S. Appl. No. 14/045,704, filed Oct. 3, 2013, Elvanoglu.
U.S. Appl. No. 10/187,221, filed Jun. 28, 2002, Alles.
Haviland, "Designing High-Performance Campus Intranets with Multilayer Switching", Cisco Systems, 1998.
Menon, "Object Replacement using Dynamic Proxy Updates" In Proceedings of the 2nd International Workshop on Configurable Distributed Systems, Mar. 21-23, 1994.
Datta, "Proxy-Based Acceleration of Dynamically Generated Content on the World Wide Web: An Approach and Implementation", ACM SIGMOD, Jun. 4-6, 2002.
Ochi, "Network Applications for Mobile Computing", FUJITSU Scientific & Technical Journal, vol. 34, No. 1, pp. 41-49, Sep. 1998.
Wu, "Sleepy Security Management with Proxy-Based Filtering (A Position Paper)", Apr. 1, 1996.
Mazouni, "Filtering Duplicated Invocations Using Symmetric Proxies", In Proceedings of the Fourth International Workshop on Object-Orientation in Operating Systems, Aug. 14-15, 1995.
Forte, "A content classification and filtering server for the Internet", In Proceedings of the ACM Symposium on Applied Computing (SAC'06), Apr. 23-27, 2006.
"Secure Sockets Layer (SSL)", IBM Knowledge Center, Jan. 31, 2001.
Ding, "Selective Java Applet Filtering on Internet", In Proceedings of the IEEE International Conference on Systems, Man, and Cybernetics (SMC'99), Oct. 12-15, 1999.
Cohen, "Improving End-to-End Performance of the Web Using Server Volumes and Proxy Filters", AT&T Labs Research, Feb. 6, 1998.
JP Notice of Rejection for Application No. 2003-164094, Sep. 18, 2009.
KR Notice of Preliminary Rejection for Application No. 10-2003-42575, May 29, 2009.
RU Official Action for Application No. 2003119524, Aug. 15, 2007.
NO Official Action for Application No. 20032997, Sep. 28, 2009.
PL Notice for Application No. P-360329, Aug. 31, 2009.
PL Notice for Application No. P-360329, Feb. 23, 2010.
BR Office Action for Application No. PI0302014-2, May 18, 2015.
Tanenbaum, "Modern Operating Systems", Second Edition, Prentice Hall, portion of section 8.3, Mar. 3, 2001.

\* cited by examiner

DISTRIBUTING NOTIFICATIONS TO MULTIPLE RECIPIENTS VIA A BROADCAST LIST

CROSS-REFERENCE TO RELATED APPLICATIONS

This application is a continuation of prior pending U.S. patent application Ser. No. 10/696,916, filed Oct. 30, 2003, and a continuation-in-part of prior pending U.S. patent application Ser. No. 10/017,680, filed Oct. 22, 2001, which claims the benefit of U.S. Provisional Patent Application Ser. No. 60/275,809, filed Mar. 14, 2001, all three of which applications are hereby incorporated by reference herein in their entirety for all purposes.

BACKGROUND

Some prior systems broadcast messages to alert users to information (e.g., for example, news updates). The broadcast messages, alerts, or other notifications include individual packets of information sent to users. These systems broadcast the messages by sequentially sending individually addressed messages (e.g., multiple messages to one addressed user, or multiple instances of one message to several addressed users). That is, the alerts are sent one by one using multiple packets even though the same information is sent to multiple users. In such systems, an individual alert is sent for each recipient. Other systems only accommodate up to twenty recipients per message. However, these systems require the content provider to explicitly address each of the recipients.

Some systems use an electronic mail alias to distribute a single electronic mail message to multiple recipients. However, such a system is dependent on and limited to the electronic mail transport medium. Existing systems fail to use a plurality of transport mediums.

Accordingly, a system for distributing notifications to multiple recipients via a broadcast list is desired to address one or more of these and other disadvantages.

SUMMARY

Embodiments of the invention include creating a broadcast list of recipients of a particular alert. Content providers send the broadcast alert to the broadcast list effecting delivery of the alert to each of the recipients on the broadcast list. In one embodiment, the broadcast list is managed and maintained by an alerts web service. A broadcast alert is intended for a scenario in which the same alert content is to be sent to multiple recipients. In one embodiment, the broadcast list represents a set of users who want to receive content such as a daily news update, breaking news, a weather forecast, or a traffic report. With a broadcast list, a content provider only sends one alert to the broadcast list instead of sending thousands or millions of alerts with each one addressed to one person only.

The broadcast list in embodiments of the invention provides scalability and allows alerts to be handled in a cost-effective way for both the content provider and distributor of alerts. Further, the broadcast list allows the content provider to offload the management and distribution of alerts to an alerts service and simplify the operations of the content provider. This reduces the packet traffic from the content providers to the alerts service significantly, and also allows the alerts service to scale better in terms of the number of packets processed per computing device associated with the web service and the reduction in database storage for the alert messages. Benefits of the broadcast list are significant particularly when the broadcast list size is fairly large (e.g., tens of thousands of members to several million members per list). Further, aspects of the invention transcend any one particular medium of delivery. That is, multiple mediums such as electronic mail, instant messaging, and mobile short-message-service messaging may be used.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

In an embodiment, the invention processes the distribution of an alert or notification (e.g., event-driven content). In particular, embodiments of the invention include software for receiving an alert from a content provider and broadcasting the alert to a plurality of users. A broadcast alert is intended for a scenario in which the same alert content is to be sent to multiple recipients. In one embodiment, the broadcast list represents a set of users who want to receive content such as a daily news update, breaking news, a weather forecast, or a traffic report. In one embodiment, an alert carries time-sensitive content. Broadcasting an alert according to the invention allows the content provider to delegate explicit addressing of the alert to the alerts service. That is, in an embodiment of the invention, the content provider transfers the addressing workload to the alerts service. The alerts service addresses the alert to each of the users associated with the broadcast alert, processes user preferences, and routes the addressed alerts to each of the intended users. Alternatively, the alerts service addresses the alerts but transfers the broadcasting workload to a gateway based on the user preferences (see FIG. 2 below). The gateway then performs the actual broadcasting of the alert to the intended users. In this embodiment, the alerts service forwards a single alert with multiple explicitly addressed users to the gateway. Further, aspects of the invention include thresholds for queue management to throttle requests incoming to the alerts service.

Alerts Environment

Figure 1:
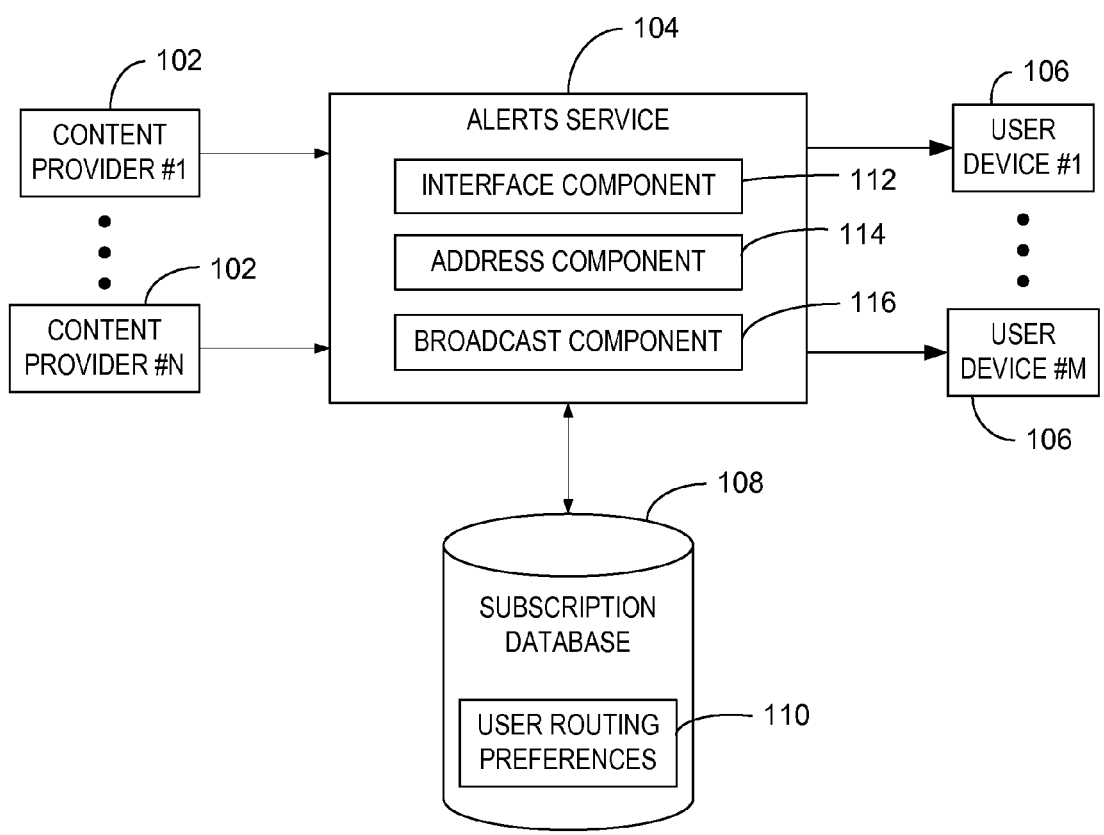
FIG. 1 is a block diagram illustrating one example of a suitable alerts service environment in which embodiments of the invention may be implemented.

Referring first to FIG. 1, an exemplary block diagram illustrates one example of a suitable alerts service environment in which embodiments of the invention may be implemented. In one example, the alerts service environment is referred to as a notification pipeline and database (NPD). FIG. 1 illustrates the communication flow between a content provider 102 such as content provider #1 through content provider #N, an alerts service 104, and a user device 106 such as user device #1 through user device #M. The content provider 102, the alerts service 104, and the user device 106 are coupled to a data communication network such as described with reference to FIG. 5 (see below). The content provider 102 sends an alert to the alerts service 104 for delivery to one or more of the user devices 106. The alerts service 104 accesses a subscription database 108 storing subscription information and user routing preferences 110 to determine which user device(s) 106 should receive the alert. The alerts service 104 then delivers the alert to the determined user device 106.

The user device 106 may be a computer such as computer 130 described with reference to FIG. 5. Further, the user device 106 may execute an alerts application (e.g., an instant messaging application) that receives and processes alerts. The alerts application executes on a user device 106 such as a cellular telephone (e.g., a Smartphone device), a pager, and a handheld computing device (e.g., a personal digital assistant or a Pocket PC device). Further, the user device 106 may include any of the above exemplary devices enabled with an information service such as a SMART PERSONAL OBJECTS TECHNOLOGY (SPOT) brand of telecommunication service and/or devices. The information service comprises a computing infrastructure (e.g., a telecommunication service) for sending data and information to personal and home devices via computer networks, wireless networks and the Internet. User devices 106 which may be enabled with the information service include, but are not limited to, the following devices: clocks, alarm clocks, radios incorporating clocks, watches, billfolds, wallets, checkbook and passbook wallets, purses, pens, metal key rings, key holders, wireless devices, computer hardware (e.g., peripherals, monitors, and displays), electronic calendar devices, and refrigerator magnets. Further, magazines, books, and user manuals relating to computers, computer programs, personal information devices and wireless communications may also incorporate the information service. The information service enables billions of devices to communicate with each other. For example, customers select the type of information and services they want to receive on the enabled devices via a configuration web page. This content is subsequently beamed to and displayed on the device. Information available to users on devices using the information service includes personal messages, calendar updates, and customized news, weather, financial and sports information.

The alerts service illustrated in FIG. 1 transcends any one particular transport medium for delivery of notifications. Aspects of the invention may use any of a plurality of transport mediums such as electronic mail, instant messaging, and mobile short-message-service messaging.

The system of FIG. 1 processes a notification or alert. The alerts service 102 includes a memory area storing a notification received from a third-party content provider 102. In one example, the memory area includes a plurality of databases. An interface component 112 receives a data packet representing the notification. The notification includes routing information and content. The routing information includes a broadcast alias. One or more computing devices associated with the alerts service 104 enable delivery of the stored notification to a plurality of users based on the broadcast alias. Software executing on each of the computing devices accesses the stored notification, determines a list of users associated with the broadcast alias for receiving the stored notification, and delivers the stored notification to the determined list of users. In one embodiment, an address component 114 determines the list of recipients associated with the broadcast alias to receive the notification. Further, a broadcast component 116 routes the notification to the determined list of recipients.

In one embodiment, the system of FIG. 1 is implemented as a web service. Further, functionality associated with the alerts service 104 of FIG. 1 may be distributed among one or more computers. For example, the alerts service 104 may include a distributed processing system such as illustrated in FIG. 2.

Figure 2:
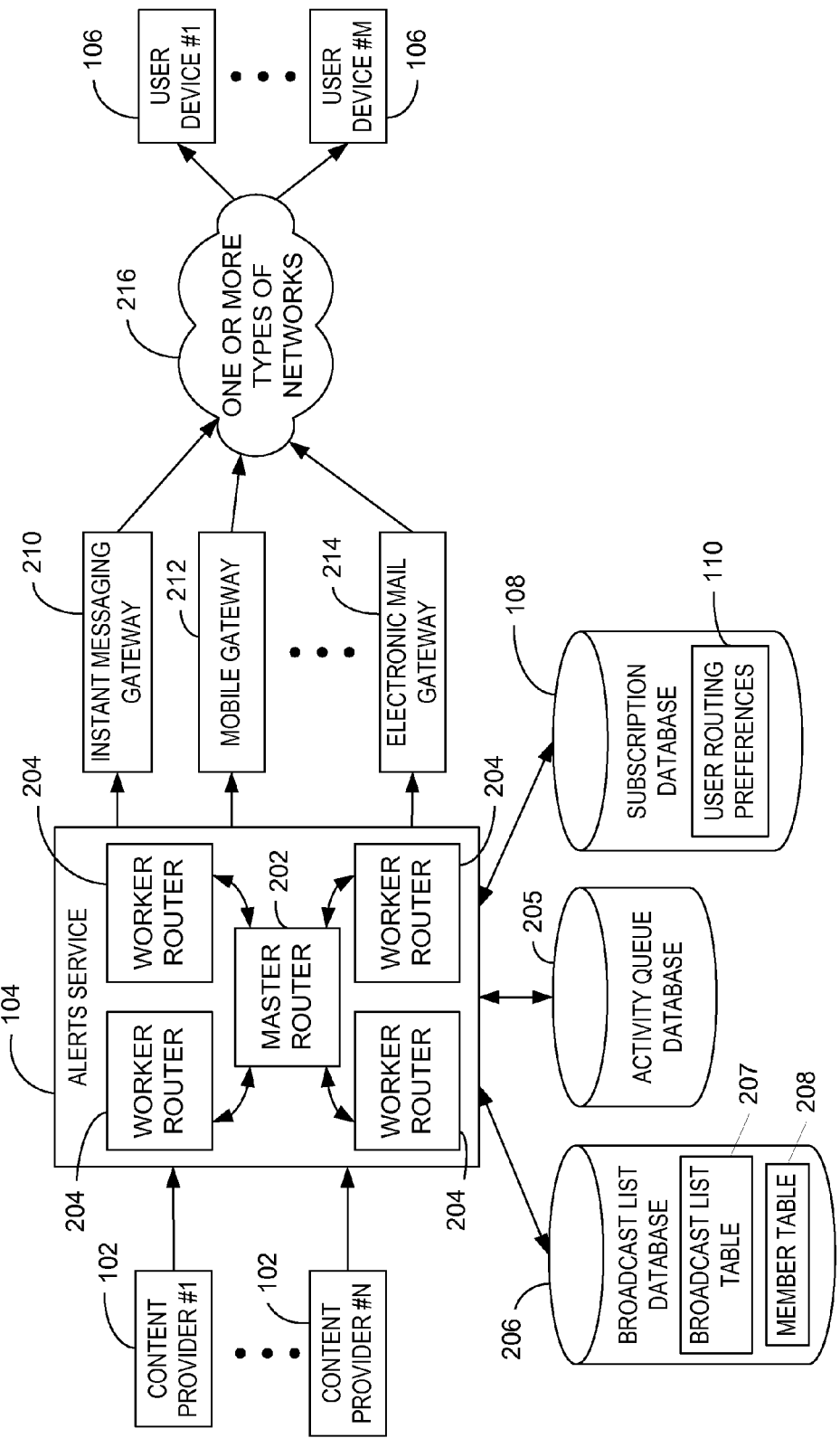
FIG. 2 is an exemplary block diagram illustrating a detailed view of the alerts service illustrated in FIG. 1.

Referring next to FIG. 2, an exemplary block diagram illustrates a detailed view of the alerts service 104 illustrated in FIG. 1. In this embodiment, the plurality of computing devices includes a master router 202 and a plurality of worker routers 204. The master router 202 associates the stored notification with one of the plurality of worker routers 204. Broadcast list processing is distributed by the master router 202 across the plurality of worker routers 204 such as NRouters. The worker routers 204 accept or reject the assigned workload based on their currently assigned workload. While any worker router 204 may act as a master router 202, the NRouter that originally receives the alert from the content provider 102 is designated as the master router 202. The master router 202 coordinates the processing of the received alert across other worker NRouters 204. The master router 202 also functions as a worker NRouter 204 to process alerts. The master NRouter 202 is responsible for logging the alert to a memory area such as an activity queue database 205. The master 202 and worker 204 routers communicate with each other through an STS (server-to-server) layer (see FIG. 4). The STS layer includes a communication component that provides a network connection between or among all routers in the system. The master router 202 and the worker routers 204 communicate with each other through an STS component. In one embodiment, a maximum of 256 worker NRouters 204 process a single broadcast list. However, there is no limit on the number of broadcast NRouters that may be deployed.

A unicast NRouter handles alert packets that are explicitly addressed to a particular user by the content provider 102. A broadcast NRouter or worker NRouter 204 processes alert packets that are addressed to a broadcast list. Both types of routers are built out of the same code base so that any NRouter may actually act as both unicast and broadcast at the same time if necessary to improve efficiency and scalability. All the broadcast NRouters are behind one fan-out logical store. The mappings are installed through an application program such as dbsmgmt. An NRouter is designated as a broadcast NRouter by adding the following entry into a configuration file such as soft.xml with appropriate values for the MAC and IP attributes and installing the mappings:

<server nam="nrouter_bcast" mac=" . . . " ip=" . . . "/>

In another configuration file such as notifications.conf, a NPD_NROUTER_CLASS field is set to Broadcast in an [NPD] section.

The master 202 and worker 204 routers access a computer-readable medium storing a data structure (e.g., in a broadcast list database 206). The data structure may be associated with an application programming interface. The data structure includes a broadcast list identifier associated with the broadcast alias and a list of the users associated with the broadcast list identifier. In one embodiment, the broadcast list database 206 includes a broadcast list table 207 associating the broadcast list identifier with a specific member table 208 storing the list of users associated with the broadcast list identifier. The subscription database 108 or a user profile database stores the user routing preferences 110. Invention software routes the stored notification to the users on the determined list based on user routing preferences 110 corresponding thereto stored in the subscription database 108.

In another embodiment, the alerts service identifies the users associated with the broadcast alias, but sends the notification and the identified users to one or more third-party gateways for delivery. For example, the gateways may include an instant messaging gateway 210, a mobile gateway 212, and an electronic mail gateway 214. The third-party gateways route the notification to the user devices 106 associated with the identified users via one or more types of networks 216.

Alerts Service Operation

Figure 3:
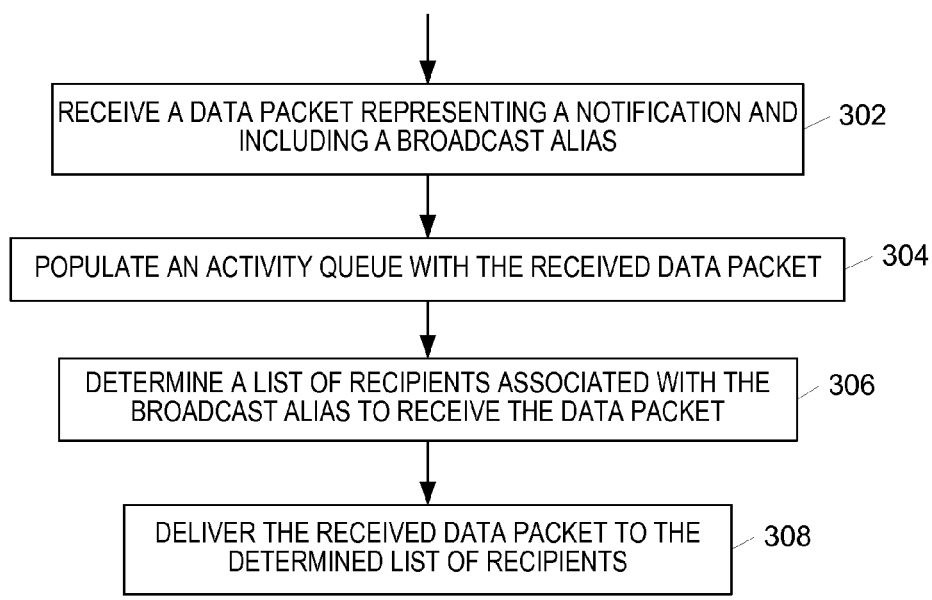
FIG. 3 is an exemplary flow chart illustrating operation of the alerts service.

Referring next to FIG. 3, an exemplary flow chart illustrates operation of the alerts service. One or more computer-readable media have computer-executable instructions for performing the method illustrated in FIG. 3. Software or other computer-executable instructions embodying aspects of the invention receives a data packet representing a notification at 302. The data packet has routing information including a broadcast alias. The software populates an activity queue with the received data packet at 304 and subsequently accesses the activity queue to obtain the stored data packet. The software determines a list of recipients associated with the broadcast alias to receive the data packet at 306. In one embodiment, the software retrieves a broadcast list identifier from a broadcast list table via the broadcast alias. The software identifies one or more recipients associated with the broadcast list identifier by accessing a member list table. The software delivers the received data packet to the determined list of recipients at 308.

In the master/worker router embodiment of FIG. 2, the software receives an alert from a content provider directed to a broadcast list alias. The master router parses the alert packet and verifies or validates the content provider. The master router stores the alert in the activity queue database. The master router accesses the broadcast list database using information in the packet such as the broadcast list alias. In one embodiment, the master router uses a content provider identifier and the alias to obtain the broadcast list identifier. There is a user/member table for each broadcast list identifier which lists all users/members associated with the broadcast list identifier. For example, the member table may be one table with multiple partitions. Every row in the member table has a broadcast list identifier, a sequence number (unique to the broadcast list identifier and user), and a unique identifier for each user.

The master router distributes processing based on the number of members for the broadcast list identifier and the number of worker routers available. The master router may queue multiple work items for each worker router. In one embodiment, the master router stores a table of the worker routers (including itself) in memory such as a state table. In another embodiment, the master router stores the table in a database such as a persistent SQL database. Storing the state information in a database provides reliability should the master router become unavailable.

Each worker router accepts assigned work (e.g., by accessing the activity queue) and processes the assigned work item by accessing the member table to obtain a list of users, loading user preferences (e.g., from a user profile database) for each user on the list, and delivering the alert to each user based on the preferences. In one embodiment, the user profile database includes a SQL table indexed by a user identifier, a user name, and routing preferences.

With aspects of the invention, each content provider sends a single packet to the alerts service for delivery to a broadcast list of users. In an alternative embodiment, the alerts service identifies the individual users associated with the broadcast list, and transfers the packet and the list of users to another computing device (e.g., a gateway) to perform the routing. That is, the software sends the received data packet and the determined list of recipients to a third-party gateway for routing the received data packet to each of the recipients on the determined list. The software effects the routing of the received notification to each of the recipients on the determined list.

In particular, an NRouter identifies a packet addressed to a broadcast list by the presence of the attribute listed on the TO element as shown below:

<TO listid=" . . . ">

In one form, the listid is in hexadecimal format and between the range 0 through (2^32)−1 (i.e., approximately four billion values). This corresponds to the npd_ListID column in the npd_BroadcastList table discussed below. The content provider provisions the listid with the alerts service.

Figure 4A:
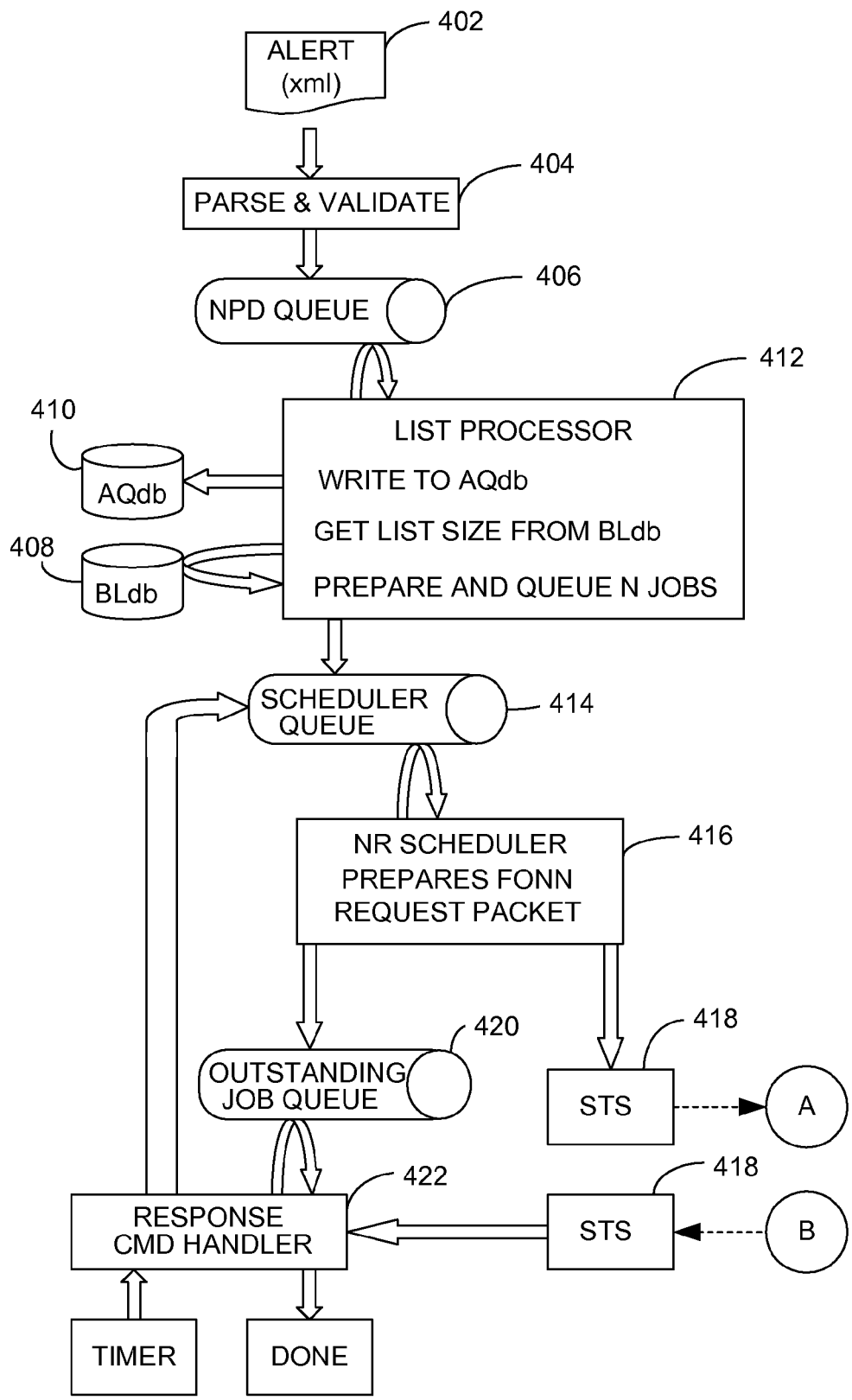
FIG. 4A is an exemplary block diagram illustrating operation of software executed by a master router in the alerts service.

Referring next to FIG. 4A, an exemplary block diagram illustrates operation of software executed by a master router in the alerts service. When a content provider posts an alert 402 such as in the form of an extensible markup language (XML) document to the master NRouter at 402, the master NRouter parses the alert 402 and validates the packet at 404. In one embodiment, the master NRouter applies usage and throttle limits. The master NRouter then acknowledges receipt of the alert 402 by returning a message with HSE_S-TATUS_PENDING status to the content provider. The master NRouter asynchronously processes the alert 402 by queuing the alert 402 into an NPD queue 406 or other memory area. The NPD queue 406 represents an internal queue of work items that are acted upon by any one of the multiple threads in the thread pool, but only one thread processes the item at any given time.

The master NRouter then retrieves information regarding the specific broadcast list specified in the alert 402, such as the number of members or users, and an internal 32-bit row identifier from a database such as BLdb. The master NRouter enforces the usage limits for the content provider, if any, and logs the alert 402 to an activity queue database such as AQdb 410. A copy of the broadcast activity is logged to every physical bucket in each activity queue physical store. This is done before returning a final status to the content provider. If the master NRouter is unsuccessful during any of the above processing, it returns an error code such as "500 Server Error" with status=600. Otherwise, the master NRouter returns "202 Accepted" with status=100.

A list processor module 412 associated with the master NRouter picks up the queued packet and uses the size of the broadcast list to determine an optimum number of processing jobs to schedule across the worker NRouters. These jobs are then queued into a scheduler queue 414 and handed off to a scheduler module 416 which packages each job into a request packet (e.g., as defined by a fan-out protocol) and assigns each job to an appropriate logical area of the logical NRouter in the STS layer 418. These logical areas map to the various NRouters. The scheduler module 416 also adds an entry into an outstanding jobs queue 420 with an appropriate expiration timestamp. The list row identifier, a tick-count and a chunk identifier together make up the key by which the outstanding jobs queue 420 is searched. A response command handler 422 or other monitor process executing on the master NRouter periodically checks the outstanding jobs queue 420 (e.g., every 5 minutes) and reschedules expired jobs if necessary. In one embodiment, the periodic interval is configurable and rescheduling occurs up to a total of three times before discarding the job.

Figure 4B:
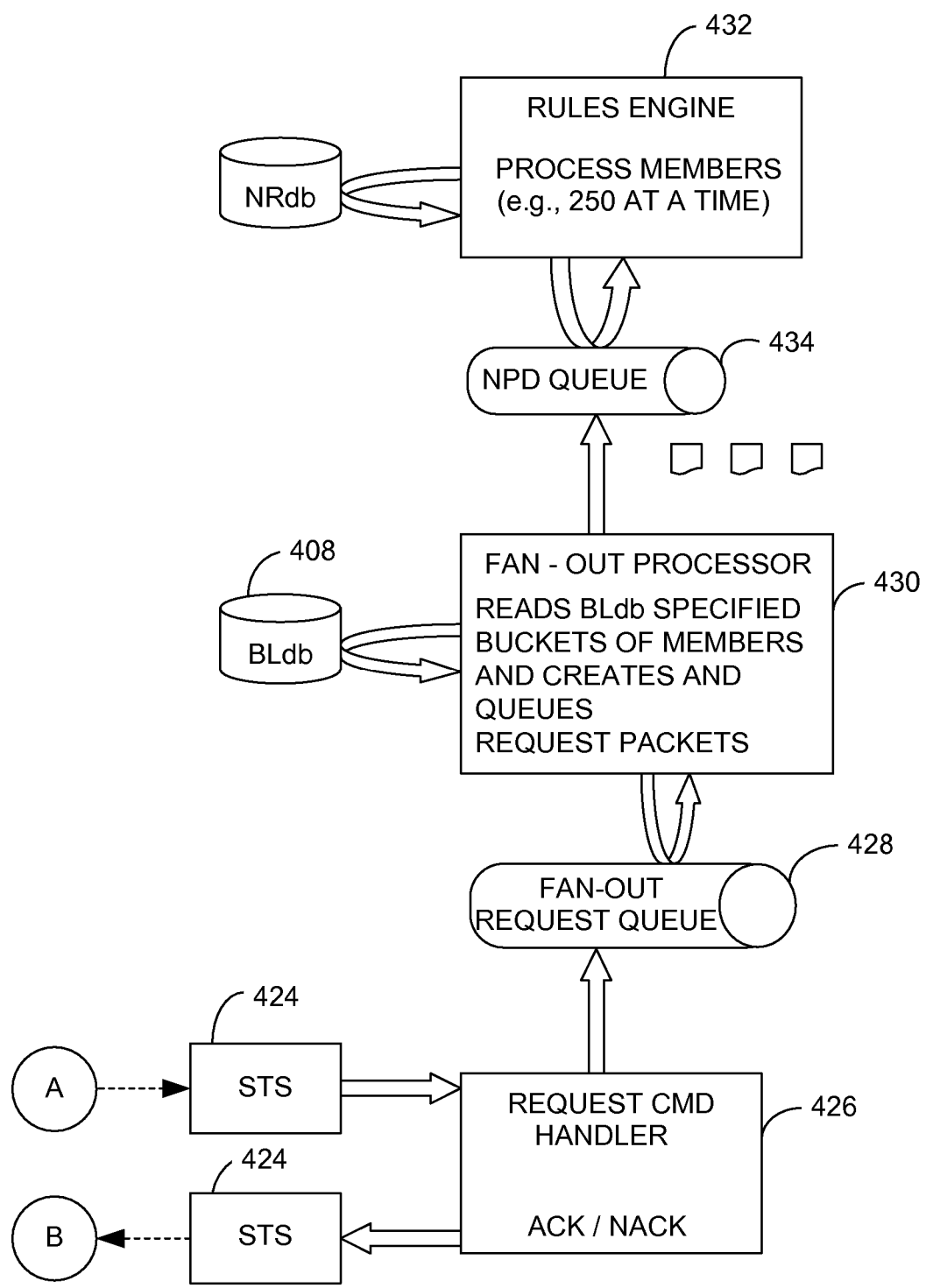
FIG. 4B is an exemplary block diagram illustrating operation of software executed by a worker router in the alerts service.

Referring next to FIG. 4B, an exemplary block diagram illustrates operation of software executed by a worker router in the alerts service. On the worker NRouter, the request packet is picked up from the STS layer 424. If that worker NRouter is willing to accept this work item, a request command handler 426 sends an acknowledgement (ACK) back to the master NRouter. Otherwise, the request command handler 426 returns a not acknowledged (NACK) status (see the fan-out NRouter to NRouter protocol illustrated in FIG. 4A). One implementation returns the ack/nack immediately and does not wait for the worker NRouter to complete its task. The job is then queued into a fan-out request queue 428. A fan-out processor 430 reads the BLdb database 408 for a range of members defined by the chunk identifiers specified in the request packet. The fan-out processor 408 creates small blocks of members (e.g., 250 members per block) for further processing by a rules engine 432. These configurable blocks are added to an NPD queue 434. The policy threads in the rules engine 432 process each block independently.

The master NRouter maintains an in-memory table of its pending jobs. Since it is in-memory, the table is susceptible to master NRouter failures. To improve reliability, the master NRouter periodically writes out its state into a table such as a structured query language (SQL) table. The worker NRouters work off of the database to update the rows corresponding to each work item belonging to a particular fan-out request. The master NRouter (or a secondary master) monitors the work items that are being updated in the database.

The following tables show exemplary request and response packet formats for use with the alerts service. The master NRouter sends the request packet to the worker NRouter to assign an alert to the worker NRouter. The worker NRouter accepts or declines the assigned alert via the response packet.

TABLE 1

Request Packet Format.

| CMD | KEY | ChunkID Start | ChunkID End | XML Size | XML Packet |
|---|---|---|---|---|---|

TABLE 2

Response Packet Format.

| CMD | KEY | ChunkID Start | ChunkID End |
|---|---|---|---|

The CMD field indicates one of the following: fan-out request processing (i.e., requests an NRouter to process a fan-out job), fan-out response accepted (i.e., worker NRouter accepts the task), or fan-out response declined (i.e., worker NRouter declines the task). The KEY field correlates outstanding jobs in the Master NRouter with the worker NRouter responses. In one example, the key field includes a List RowID and a Tick-count. The ChunkID Start and End fields specify an interval within the broadcast List member range that a worker NRouter is to process. In one example, the ChunkID start and end fields map to npd_Bucket in an npd_BroadcastListMembers table.

The fan-out processor may be fine-tuned using the following configuration settings (e.g., such as in a notifications.conf file). An NPD_BROADCAST_WORKER_IDEAL_JOB_SIZE setting represents an integral value that is used as a guideline by the master NRouter when assigning work to the worker NRouters. A default value includes 1000 list members per worker NRouter per request. An NPD_BROADCAST_JOB_EXPIRATION_TIMEOUT setting, in milliseconds, represents the time period to wait before attempting to reschedule the job with another worker NRouter. A default value includes one minute. An NPD_BROADCAST_MEMBERS_PER_POLICY_BLOCK setting represents the maximum number of recipients that are associated with an instance of the policy block. A default value includes 250 recipients.

Broadcast List Databases

Exemplary databases and tables involved with broadcast list processing include npd_BLdb_rw_1 and npd_BLdb ro$_{13}$ 1. They both contain the tables npd_BroadcastList and npd_BroadcastListMembers, and both databases have identical content.

Web page front-end computers read and write to npd_BLdb_rw_1. The broadcast list provisioning also occurs on this database. The SQL instance hosting this database also acts as a distributor for transaction replication to populate npd_BLdb_ro_1. This latter database is used by the NRouter front ends at run time. The database npd_BLdb_rw_1 may be deployed on a different network switch than npd_BLdb_ro_1. These databases are accessed in NPD via the NSD_STORE_NPD_LISTS and NSD_STORE_NPD_LISTS_PROTECTED logical stores, respectively.

The following statements create these databases in the file soft.xml:

```
<?xml version="1.0"?>
<service n="..." >
    <physicalstore srv="hostName" dtyp="blrw" />
    <physicalstore srv="hostName" dtyp="blro" />
</service>
```

In the above statements, srv represents the appropriate host machine names.

Both BLdb RW and RO databases are setup to do Read-Only failover at physical bucket (PB) level. The number of PBs for the RW database is equal to the number of RO databases (physical stores), the number of PBs for the RO database is equal to 2 per physical store. The failover generation algorithm also takes into account the network switch if specified.

TABLE 3

Exemplary Schema for npd_BroadcastList Table.
Npd_Broadcast_List Table

| npd_CPID (4 Bytes) | npd_ListID (4 Bytes) | npd_RowID (4 Bytes) | npd_MemberCount (4 Bytes) | npd_Language (4 Bytes) | npd_DisplayName (64 Bytes) |
|---|---|---|---|---|---|
| CP1 | ListID1 | 1 | 1000000 | 0 | Breaking News |
| CP1 | ListID2 | 2 | 50000 | 0 | Local News |
| CP2 | ListID1 | 3 | 15000 | 0 | Seattle Traffic |

Each row in Npd_BroadcastList table represents one broadcast list. The npd_CPID and npd_ListID together uniquely identify a list, as does the npd_RowID column by itself. The npd_CPID column corresponds to the npd_Row column in the Content Provider table. This column contains the site ID of the content provider that owns the List. The npd_ListID column contains List owner (e.g., Content Provider) defined data, and its semantics are known to the NRouter. The owner has the entire range of values at its disposal. The npd_RowID column is the identity column that contains a unique 32-bit number, and is generally used within the NPD to identify Lists. This column is related to npd_RowID column in npd_BroadcastListMembers table. This column also corresponds to the npd_SubscriptionId column in the npd_Subscriptions table in the user profile database. In the case of broadcast activities in activity queue database, its value is used for npd_ReceiverIDRow column in npd_Activity2 table. In one example, the npd_RowID is a 32-bit number. The bits or a subset thereof may be organized or otherwise given specific meaning. For example, a subset of the bits may identify a specific alert such as an hourly news update or a nightly news update. In one embodiment, the invention software codes npd_CPID and npd_ListID to map to a specific npd_RowID for lookups and modification to a specific broadcast list.

The npd_MemberCount column contains the count of members belonging to each broadcast list. The master NRouter uses this count to decompose a fan-out request into an optimum number of jobs that are then distributed across worker NRouters. The npd_Language column holds locale information in one embodiment. The npd_DisplayName column contains a user-displayable string for the given broadcast list. There may be more than one row sharing the same topic information as long as the provider specific data portion is unique. The display name is available on the first row if there are multiple rows, with the remaining rows containing a NULL for this column value.

Npd_Broadcast_List_Members Table

Each row in this exemplary table represents one subscription to a broadcast list.

TABLE 4

SQL Schema for npd_BroadcastListMembers Table.

| npd_RowID (4 Bytes) | npd_Cluster (1 Byte) | npd_PUIDhigh (4 Bytes) | npd_PUIDlow (4 Bytes) |
|---|---|---|---|
| 1 | 0 | 0x00000001 | 0x00000001 |
| 1 | 0 | 0x00000001 | 0x00000002 |
| 2 | 120 | 0x00000002 | 0x00000001 |
| 2 | 255 | 0x00000030 | 0x00000040 |
| 3 | 255 | 0x00000060 | 0x00000003 |
| 4 | 3 | 0x00000001 | 0x00000001 |
| 4 | 4 | 0x00000001 | 0x00000005 |
| 5 | 0 | 0x00000004 | 0x00000055 |
| 5 | 0 | 0x00000005 | 0x00000001 |

TABLE 4-continued

SQL Schema for npd_BroadcastListMembers Table.

| npd_RowID (4 Bytes) | npd_Cluster (1 Byte) | npd_PUIDhigh (4 Bytes) | npd_PUIDlow (4 Bytes) |
|---|---|---|---|
| 6 | 128 | 0x00000060 | 0x00000001 |
| 6 | 255 | 0x00000067 | 0x00000004 |

The npd_RowID column contains a 32-bit value that uniquely identifies a List. This column corresponds to the npd_RowID column in npd_BroadcastList table. The members of each List are grouped into one of the 256 possible npd_Cluster clusters. The master NRouter assigns one or more clusters at a time to each worker NRouter for processing. The value is based on a hash of the member PUID. The npd_PUIDhigh and npd_PUIDlow columns represent identifiers that uniquely identify a single user.

npd_Activity2 Table

The primary clustered index is based on npd_ReceiverIDtype, npd_ReceiverIDbucket, npd_ReceiverIDrow, and npd_ID. The npd_ReceiverIDtype ensures that all broadcast activities are grouped together and all unicast activities are together so as to take advantage of SQL page caching, as each broadcast activity is read by more than one user. Typically, the read/write ratio for broadcast activities is very high compared to unicast activities.

The NRouter logs a copy of the broadcast activity to each of the physical buckets in the activity queue database. During a read operation, the user is directed to one of these copies based on a function of the user's bucket.

Activity Queue Server (AQS)

The activity queue database stores the alerts for each user for a time interval (e.g., twenty-four hours) configurable by an administrator of the alerts service or by the user. In one example, a broadcast activity table includes multiple rows. Each row stores a user identifier and an alert. Each user may be allocated one or more rows. In another example, each message is stored once, while a list of recipients of the message is stored and associated with the message.

The AQS runs a separate set of threads to handle broadcast activity expiration enforcement, and dirty bucket cleanup due to failover. The related SQL stored procedures have been modified to take an extra argument to distinguish broadcast from unicast activities. Broadcast activities are cleaned up at the same frequency as unicast activities.

Broadcast List Programming Interface

Application programming interfaces (APIs) are exposed (e.g., as a web service) to content providers to create and maintain broadcast list IDs. In one example, this function is implemented by a subscription management service. Exemplary APIs for managing broadcast lists are described in Appendix A.

Exemplary Operating Environment

Figure 5:
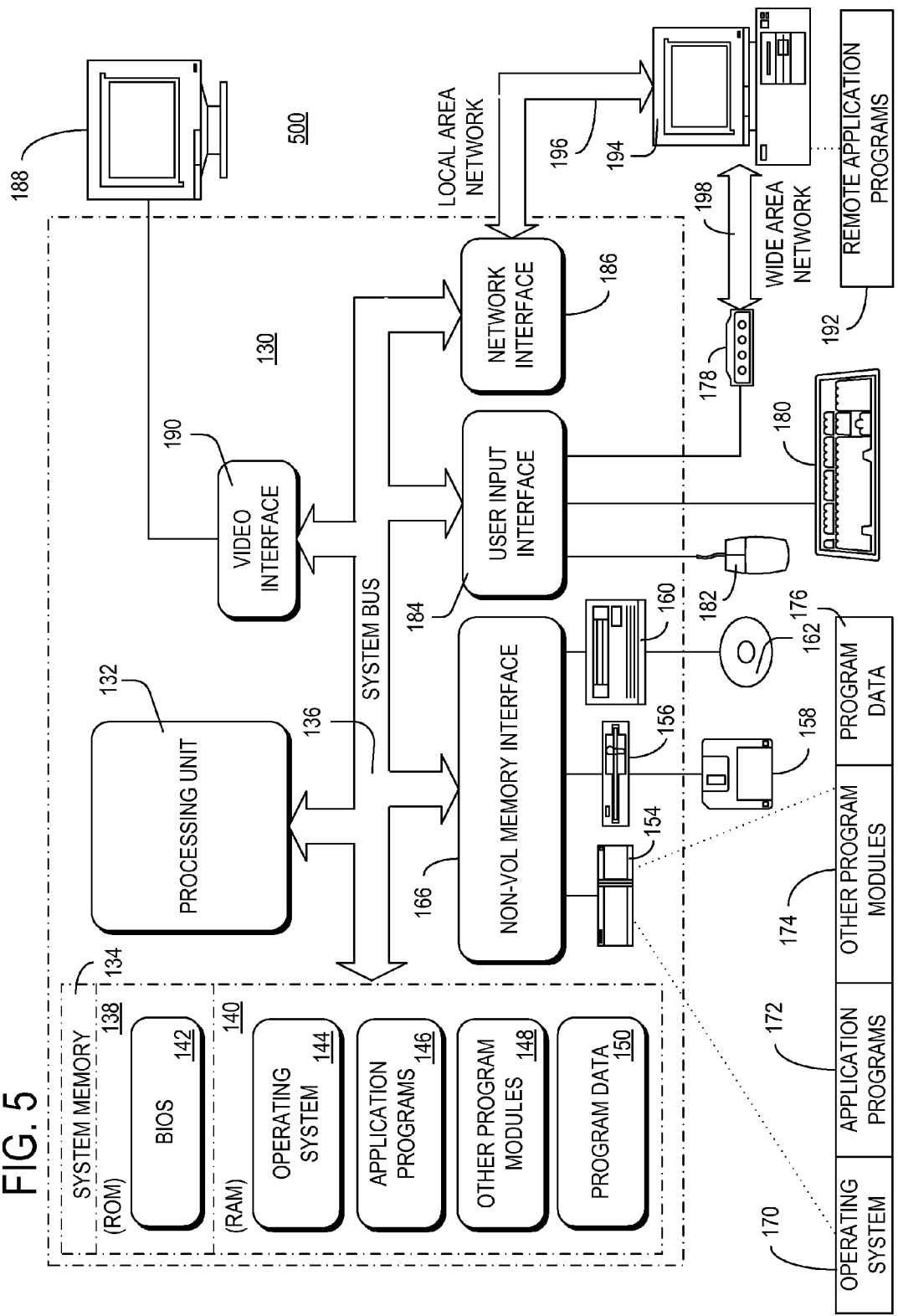
FIG. 5 is a block diagram illustrating one example of a suitable computing system environment in which embodiments of the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein include these and other various types of computer-readable storage media when such media contain instructions or programs for implementing the steps described below in conjunction with a microprocessor or other data processor. Embodiments of the invention also include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, aspects of the invention are operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 3 to process a notification by receiving the notification addressed to a broadcast alias, determining the list of recipients associated with the broadcast alias, and delivering the notification to each recipient on the list.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

The following exemplary APIs enable management and maintenance of broadcast lists.

Broadcast List Table Related

Structure:

npdBroadcastList bufBL;

To create a broadcast list:

```
Set
    bufBL.ulCPID
    bufBL.ulListID
    bufBL.ulLanguage
    bufBL.szDisplayName
Call
    npdCreate(NSD_OBJECT_( NSD_STORE_NPD_LISTS,
    NPDTYPE_LIST), &bufBL);
```

To get all the properties of a broadcast list:

```
Set
    bufBL.ulCPID
    bufBL.ulListID
Call
    npdGet(NSD_OBJECT_( NSD_STORE_NPD_LISTS,
    NPDTYPE_LIST), 0, &bufBL);
```

To iterate all the broadcast lists:

```
Set
    bufBL.szDisplayName to non-empty string.
    bufBL.ulLanguage to ~0 (to retrieve all language rows)
Call
    npdGetIteratorHandle
    (NSD_OBJECT_( NSD_STORE_NPD_LISTS,
    NPDTYPE_LIST), NPDHOW_BYNAME, 0, &bufBL, ...);
    Similarly for npdGetIterator.
```

Broadcast List Members Table Related
    Structure:
    npdBroadcastListMember bufBLM;
    To add a member to a broadcast list:

```
Set
    bufBLM.ulCPID
    bufBLM.ulListID
    bufBLM.ulPUIDhigh
    bufBLM.ulPUIDlow
Call
    npdCreate(NSD_OBJECT_( NSD_STORE_NPD_LISTS,
    NPDTYPE_LIST_MEMBER), &bufBLM);
```

To remove a member from a broadcast list:

```
Set
    bufBLM.ulCPID
    bufBLM.ulListID
    bufBLM.ulPUIDhigh
    bufBLM.ulPUIDlow
Call
    npdDelete(NSD_OBJECT_( NSD_STORE_NPD_LISTS,
    NPDTYPE_LIST_MEMBER), 0, &bufBLM);
```

To modify a broadcast list:
Use a combination of npdDelete and npdCreate to accomplish this operation.
To iterate all the broadcast list members:

```
Set
    bufBLM.ulRowID - obtained from npd_BroadcastList table.
    bufBLM.bCluster - Start of the range
    bufBLM.bCluster2 - End of the range
        bCluster = 0, bCluster2 = 255 returns the entire set of members,
        for large lists a subset is specified, bCluster = 0, bCluster2 = 1
``` to return approximately the first 20% of the list, bCluster = 2, bCluster2 = 3 the next 20% and so on.

```
Call
    npdGetIteratorHandle (NSD_OBJECT_(
    NSD_STORE_NPD_LISTS_PROTECTED , NPDTYPE_LIST),
    NPDHOW_BYID, &bufBLM, ...);
    Similarly for npdGetIterator. The store type specified is the BLdb_ro,
    but BLdb_rw is also appropriate depending on the need.
```

Subscriptions Table Related
    Structure:
    npdListSubscription bufLS;
    To create a broadcast list subscription for a user:

```
Set
    bufLS.ulCPID
    bufLS.ulListID
    bufLS.ulUserPUIDhigh
    bufLS.ulUserPUIDlow
    bufLS.bufSubscription.ulRouting
Call
    npdCreate(NSD_OBJECT_(NSD_STORE_NPD_USER,
    NPDTYPE_SUBSCRIPTION_LIST), &bufLS);
```

This does two things. 1) Creates an entry in the broadcast list member table 2) Creates an entry in the user subscriptions table.
To delete a single broadcast list subscription of a user:

```
Set
    bufLS.ulCPID
    bufLS.ulListID
    bufLS.ulUserPUIDhigh
    bufLS.ulUserPUIDlow
Call
    npdDelete(NSD_OBJECT_(NSD_STORE_NPD_USER,
    NPDTYPE_SUBSCRIPTION_LIST), NPDHOW_BYLISTS,
    &bufLS);
```

This does two things. 1) Deletes the entry in the broadcast list member table 2) Deletes the entry in the user subscriptions table.
To delete all broadcast list subscriptions for a content provider of a user:

```
Set
    bufLS.ulCPID
    bufLS.ulUserPUIDhigh
    bufLS.ulUserPUIDlow
Call
    npdDelete(NSD_OBJECT_(NSD_STORE_NPD_USER,
    NPDTYPE_SUBSCRIPTION_LIST), NPDHOW_BYCP, &bufLS);
```

This does two things. 1) Deletes all entries that belong to the given content provider for the user in the broadcast list member table 2) Deletes all the list subscription entries in the user subscriptions table that belong to the given content provider.

Activity Table Related
    Structure:
    npdBroadcastActivity bufBA (same as npdActivity)
    To create a broadcast activity:
    To create a copy of the broadcast activity in every physical bucket of each AQ logical store, use npdModify instead of npdCreate.

```
Set
    All the appropriate fields in bufBA, similar to npdActivity except the
    following:
        ulReceiverIDrow - contains the value of ulRowID column in
        npdBroadcastList table, for the given list.
        wReceiverIDbucket - is automatically computed by the API.
        usReceiverIDtype - should be NPDTYPE_LIST
Call
    npdModify(NSD_OBJECT_(
    NSD_STORE_NPD_BROADCASTACTIVITY,
    NPDTYPE_BROADCASTACTIVITY),
    NPDHOW_LOG_BROADCAST, &bufBA);
```

To get all broadcast activities belonging to a user:

Since the activities are filed under the list row identifier, the list row identifiers may be found by determining all the list subscriptions of the user. This information is input into a special query to gather all broadcast activities for the given user.

```
Set
    bufBA.ulReceiverIDrow - User's rowID.
    bufBA.wReceiverIDbucket - User's bucket
Call
    npdGetIteratorHandle (NSD_OBJECT_(
    NSD_STORE_NPD_BROADCASTACTIVITY,
    NPDTYPE_BROADCASTACTIVITY), NPDHOW_BYLISTS,
    &bufBA, ...);
```

Similarly for npdGetIterator.

What is claimed is:

1. A system for processing a notification, said system comprising:
    a computing device configured for receiving from a content provider a data packet that represents a notification and that includes routing information that includes a broadcast alias that is associated with a list of recipients;
    the computing device further configured for parsing the received data packet;
    the computing device further configured for validating the content provider identified by the parsed data packet, the validated content provider having been previously digitally signed and certified by some entity;
    the computing device further configured for accessing the list of recipients associated with the broadcast alias obtained from the parsed data packet; and
    the computing device further configured for delivering, in response to the receiving, the parsing, the validating, and the accessing, the received data packet to a plurality of recipients indicated by the accessed list of recipients associated with the broadcast alias obtained from the parsed data packet.

2. The system of claim 1, wherein the computing device comprises a master router and a plurality of worker routers, said master router configured to associate the notification with one of the plurality of worker routers.

3. The system of claim 1, wherein the computing device is coupled to a plurality of databases.

4. The system of claim 1, further comprising a computer-readable medium having stored thereon a data structure associated with an application programming interface, said data structure comprising:
    a broadcast list identifier associated with the broadcast alias; and
    a list of users associated with the broadcast list identifier.

5. The system of claim 4, further comprising a broadcast list table configured to associate the broadcast list identifier with a member table, said member table configured to store the list of users associated with the broadcast list identifier.

6. The system of claim 1, wherein the delivering is based on user routing preferences.

7. The system of claim 1, the computing device further configured for delivering the received data packet by sending the received data packet to a third-party gateway that is configured to deliver the received data packet to each of the plurality of recipients indicated by the accessed list of recipients associated with the broadcast alias obtained from the parsed data packet.

8. A method for processing a notification, said method comprising:
    receiving, by a computing device from a content provider, a data packet that represents a notification and that includes routing information that includes a broadcast alias that is associated with a list of recipients, the computing device coupled to the content provider via a data communication network;
    parsing the received data packet;
    validating the content provider identified by the parsed data packet, the validated content provider having been previously digitally signed and certified by some entity;
    accessing, by the computing device, the list of recipients associated with the broadcast alias obtained from the parsed data packet; and
    delivering, by the computing device in response to the receiving, the parsing, the validating, and the accessing, the received data packet to a plurality of recipients indicated by the accessed list of recipients associated with the broadcast alias obtained from the parsed data packet.

9. The method of claim 8, further comprising populating an activity queue with the received data packet.

10. The method of claim 9, further comprising accessing the activity queue to obtain the stored data packet.

11. The method of claim 8, wherein the accessing the list of recipients comprises:
    retrieving, based on the broadcast alias, a broadcast list identifier from a broadcast list table; and
    identifying one or more recipients associated with the broadcast list identifier by accessing a member list table, said one or more recipients indicated by the list of recipients.

12. The method of claim 8, wherein delivering the received data packet comprises sending the received data packet and the accessed list of recipients to a third-party gateway configured for delivering the received data packet to each of the plurality of recipients indicated by the accessed list of recipients associated with the broadcast alias.

13. The method of claim 8, wherein delivering the received data packet to the plurality of recipients indicated by the accessed list of recipients comprises delivering the received data packet to computing devices associated with each of the plurality of recipients indicated by the accessed list of recipients associated with the broadcast alias.

14. The method of claim 13, wherein the computing devices include one or more of the following: a cellular telephone, a pager, a handheld computing device, and a smart personal object.

15. The method of claim 8, wherein delivering the received data packet comprises delivering the received data packet via one or more transport mediums.

16. The method of claim 15, wherein the transport mediums include one or more of the following: electronic mail, instant messaging, and mobile short-message-service messaging.

17. At least one computer storage device storing computer-executable instructions that, when executed by a computing device, cause the computing device computer to perform a method for processing a notification, said method comprising:

receiving a data packet that represents notification and that includes routing information that includes a broadcast alias that is associated with a list of recipients;

parsing the received data packet;

validating the content provider identified by the parsed data packet, the validated content provider having been previously digitally signed and certified by some entity;

determining, based on the broadcast alias, a list of recipients associated with the broadcast alias obtained from the parsed data packet; and delivering, in response to the receiving, the parsing, the validating, and the determining, the received data packet to a plurality of recipients identified by the determined list of recipients associated with the broadcast alias obtained from the parsed data packet.

18. The at least one computer device media of claim 17, the determining further comprises retrieving, based on the broadcast alias, a broadcast list identifier from a broadcast list table and identifying one or more recipients associated with the broadcast list identifier by accessing a member list table, said one or more recipients comprised by the list of recipients.

19. The computer storage device of claim 17, wherein the data packet includes time-sensitive content.

* * * * *